Feb. 9, 1943.  J. E. REGAN ET AL  2,310,461
VERTICAL CONVEYER SYSTEM
Filed June 20, 1941  11 Sheets-Sheet 2
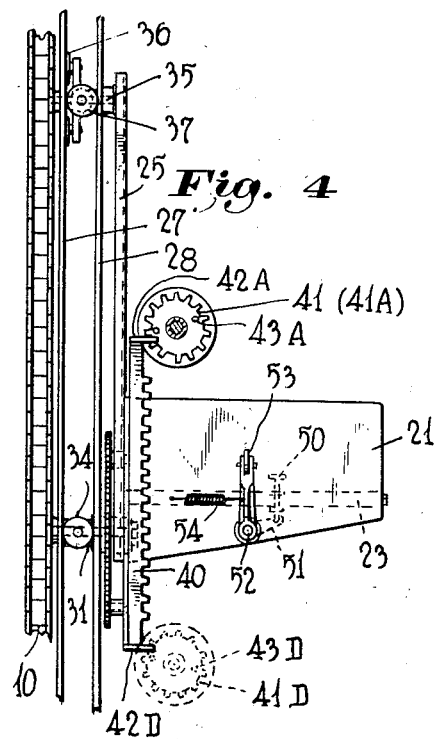
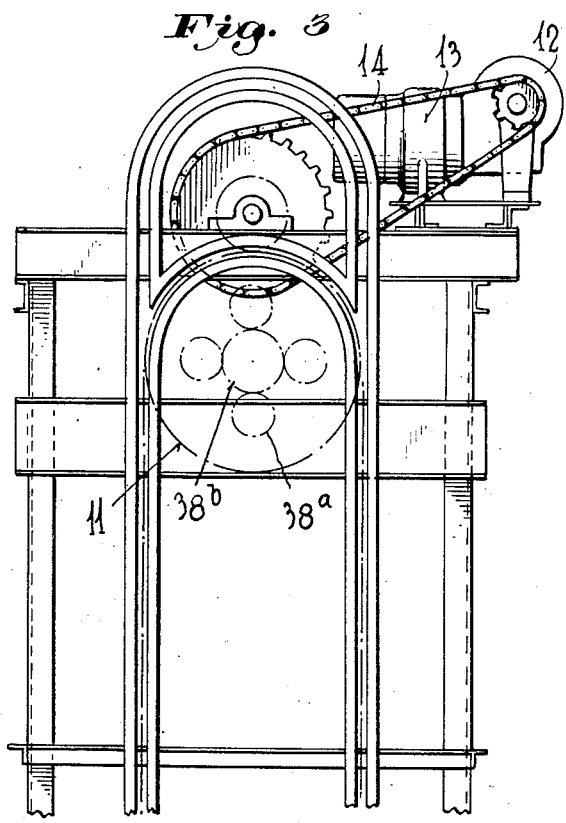
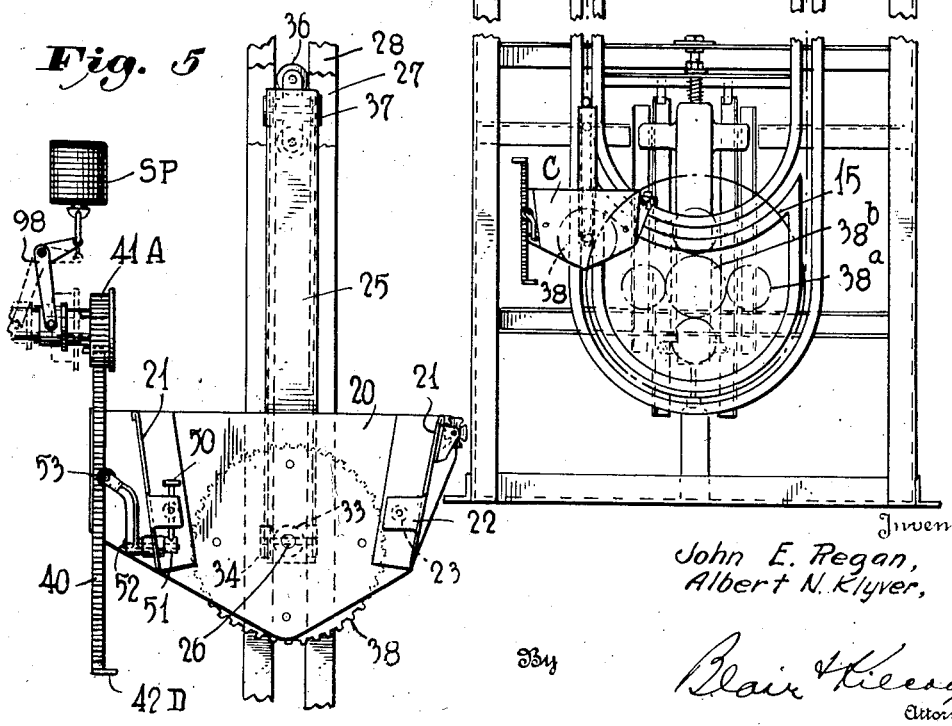
Inventors
John E. Regan,
Albert N. Klyver,
By
Blair & Kilcoyne
Attorneys Feb. 9, 1943.　　　J. E. REGAN ET AL　　　2,310,461
VERTICAL CONVEYER SYSTEM
Filed June 20, 1941　　　11 Sheets-Sheet 3

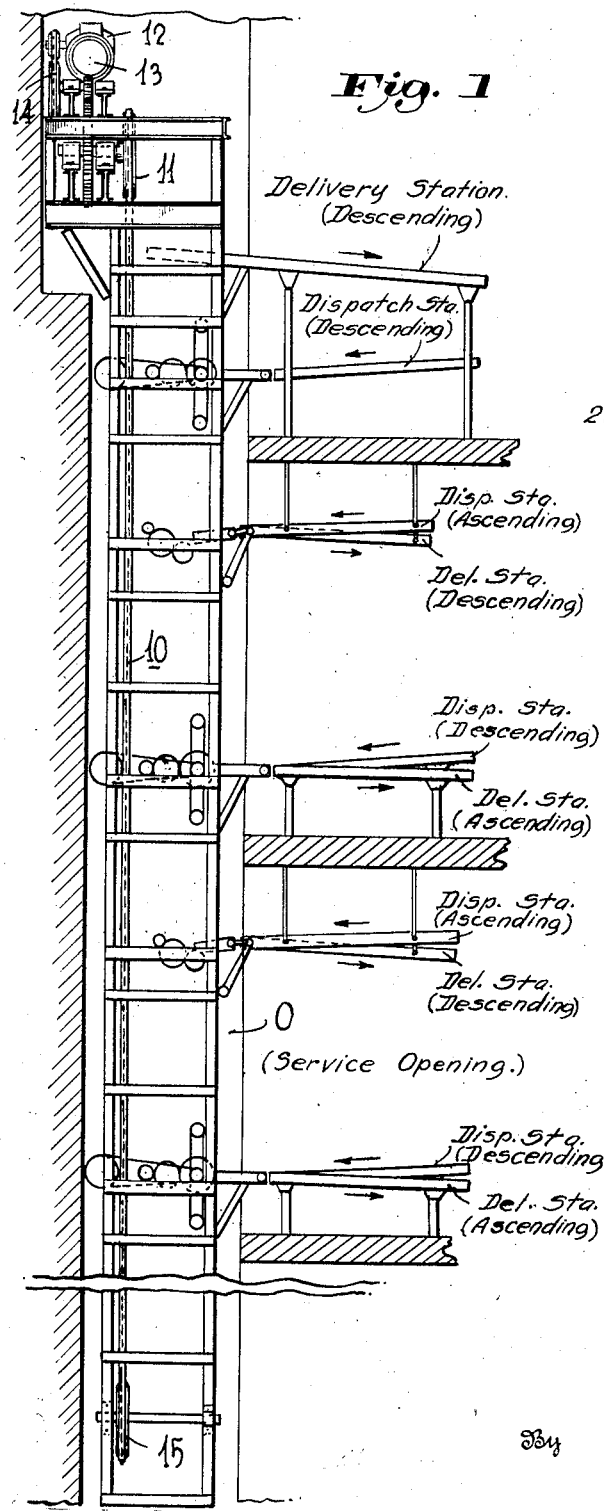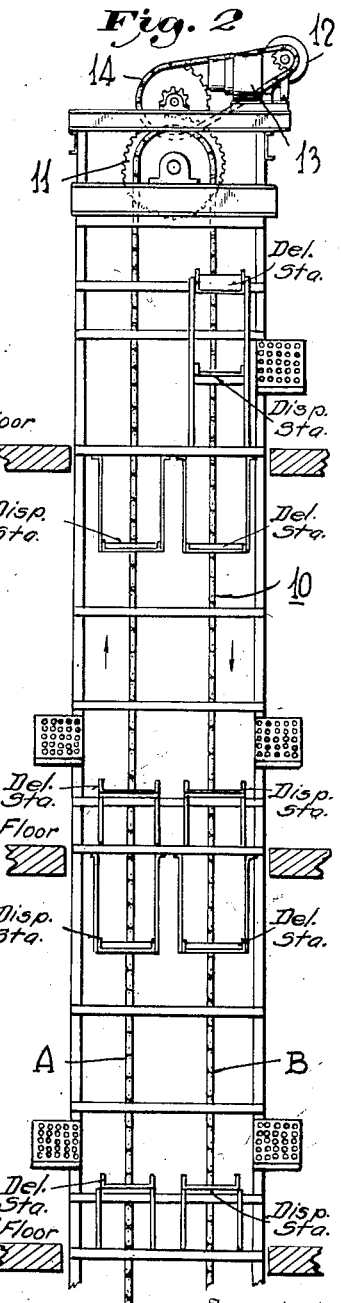

Inventors
John E. Regan,
Albert N. Klyver,
Attorneys

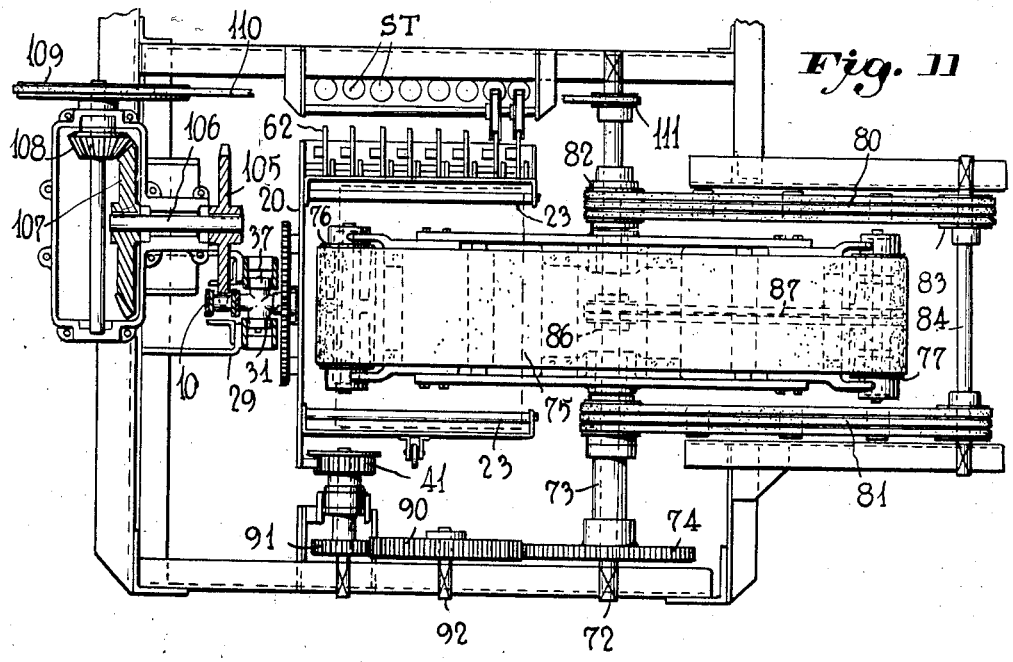
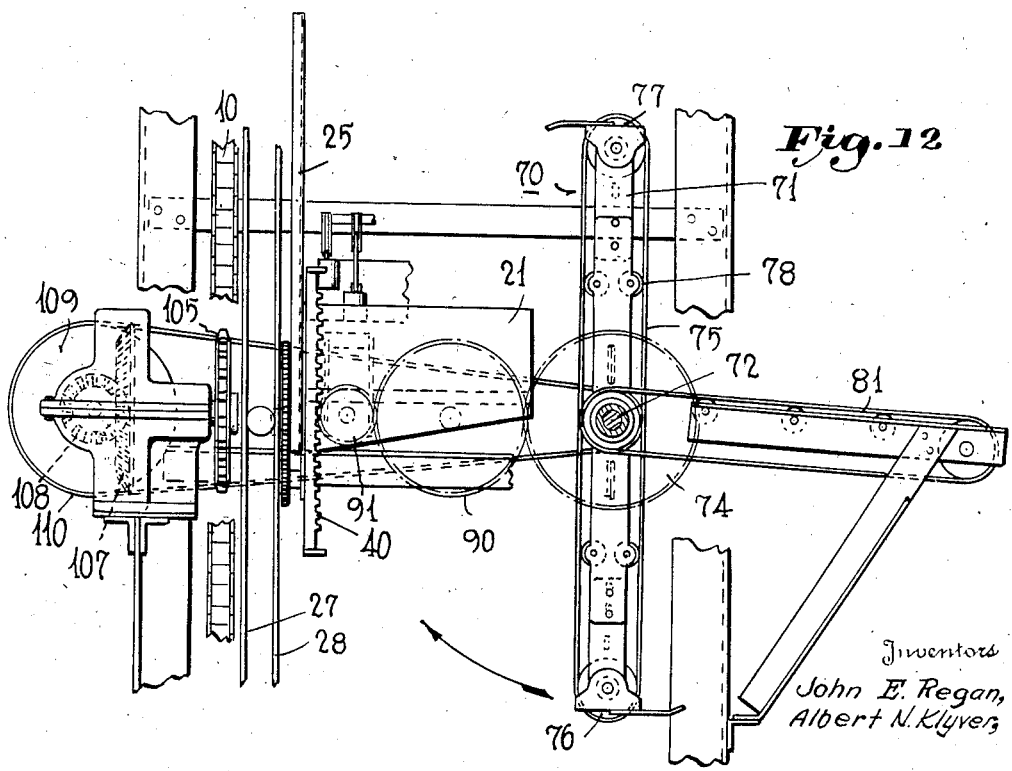

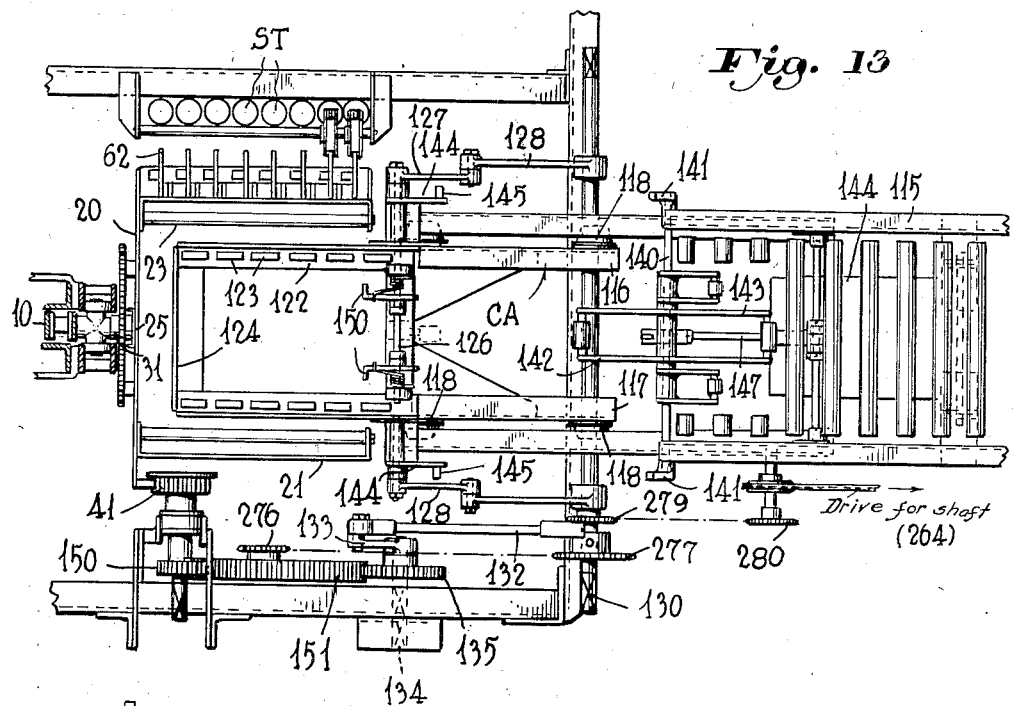

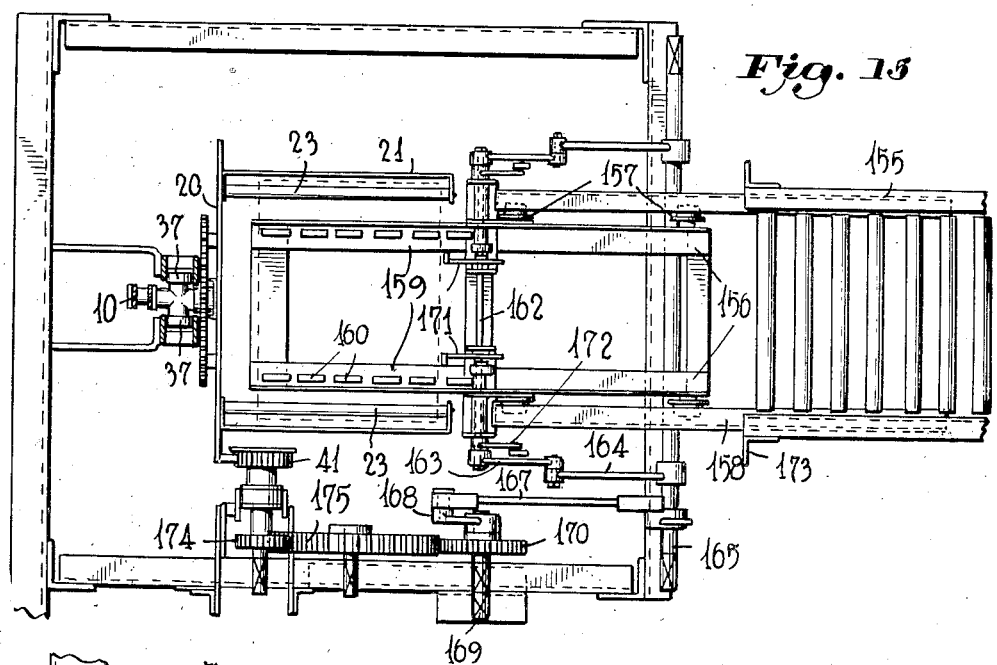
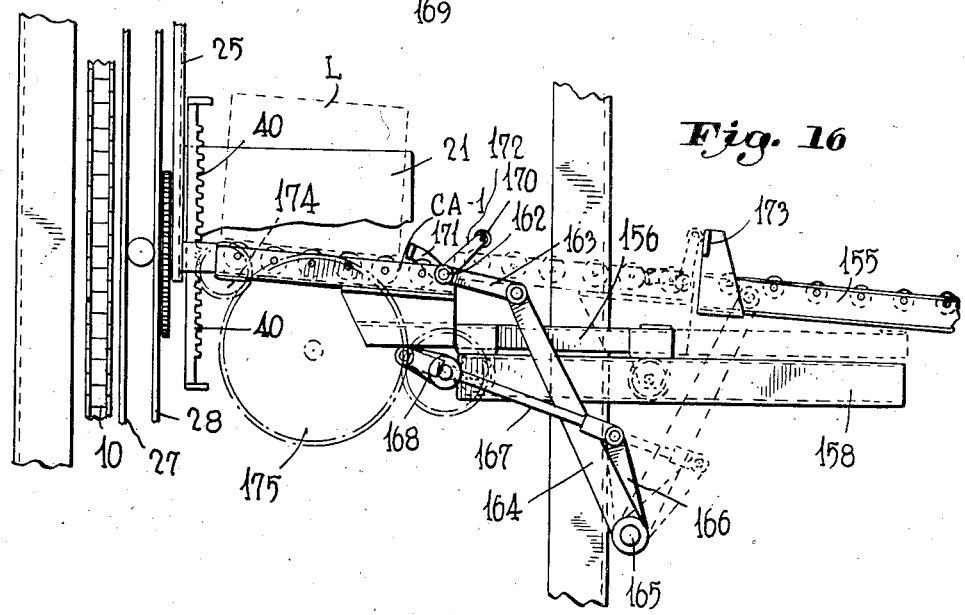

Feb. 9, 1943.  J. E. REGAN ET AL  2,310,461
VERTICAL CONVEYER SYSTEM
Filed June 20, 1941  11 Sheets-Sheet 7
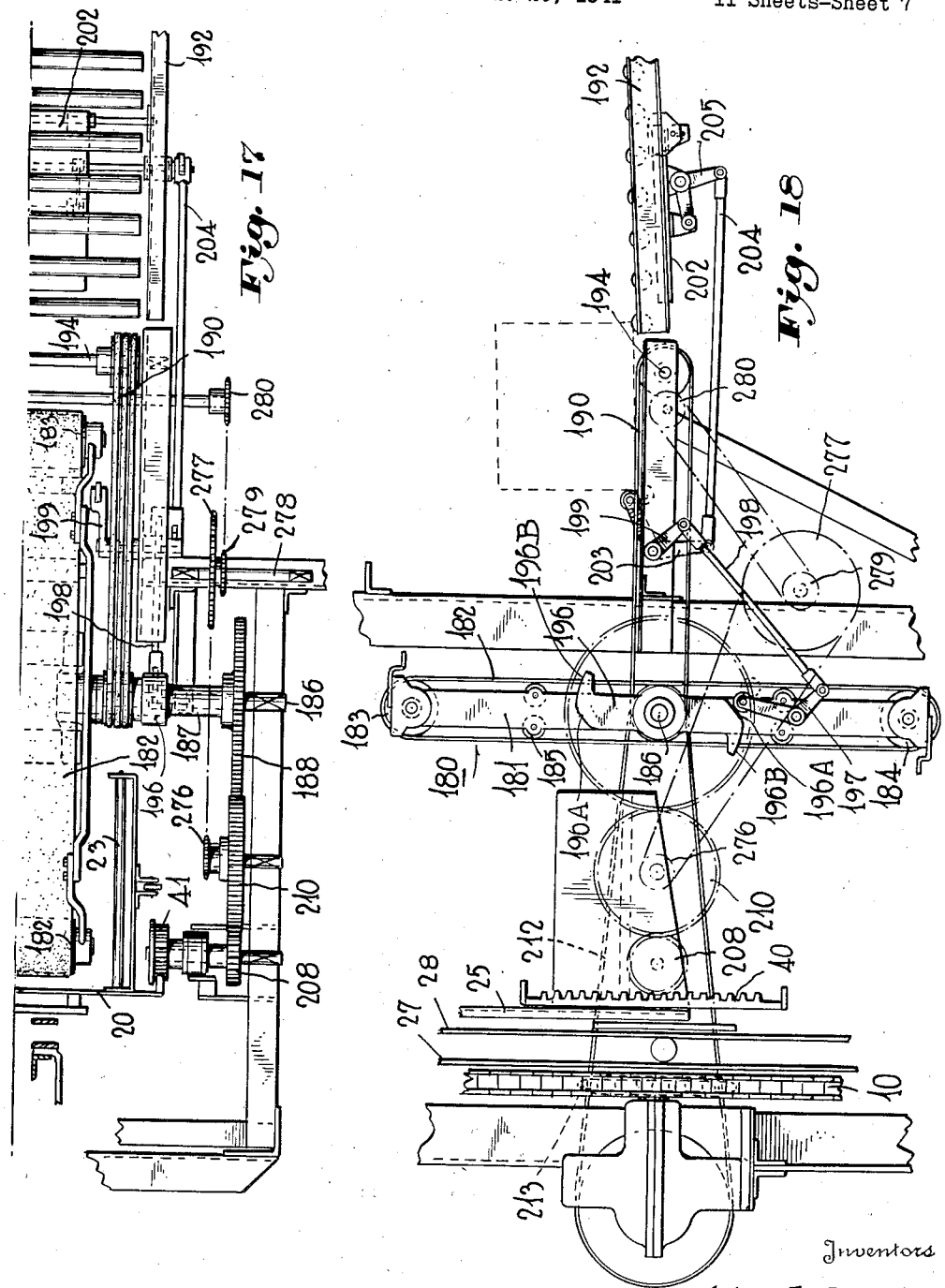
Inventors
John E. Regan,
Albert N. Klyver,
By Blair & Kilcoyne
Attorneys

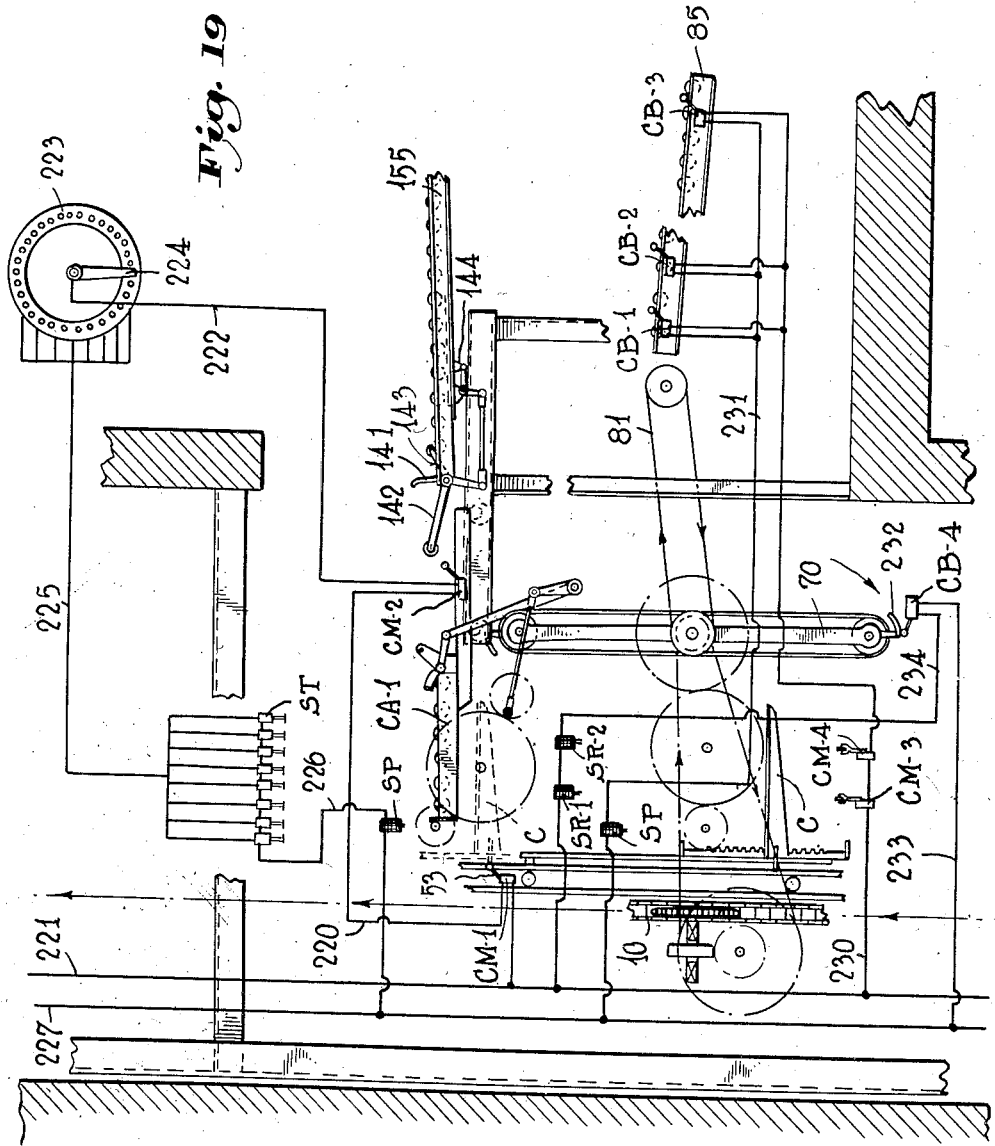

Feb. 9, 1943. J. E. REGAN ET AL 2,310,461
VERTICAL CONVEYER SYSTEM
Filed June 20, 1941 11 Sheets-Sheet 9

Inventors
John E. Regan,
Albert N. Klyver,

Attorneys

Feb. 9, 1943. J. E. REGAN ET AL 2,310,461
VERTICAL CONVEYER SYSTEM
Filed June 20, 1941 11 Sheets-Sheet 10
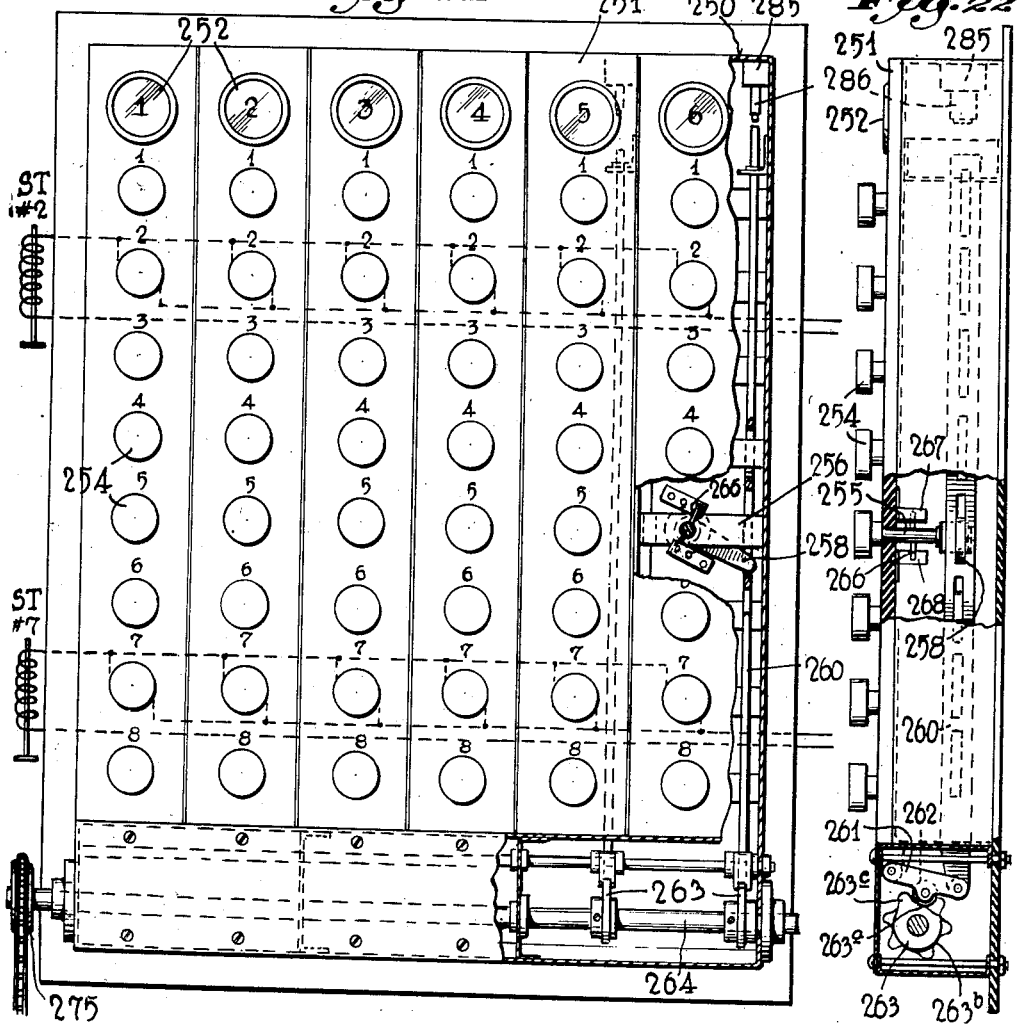
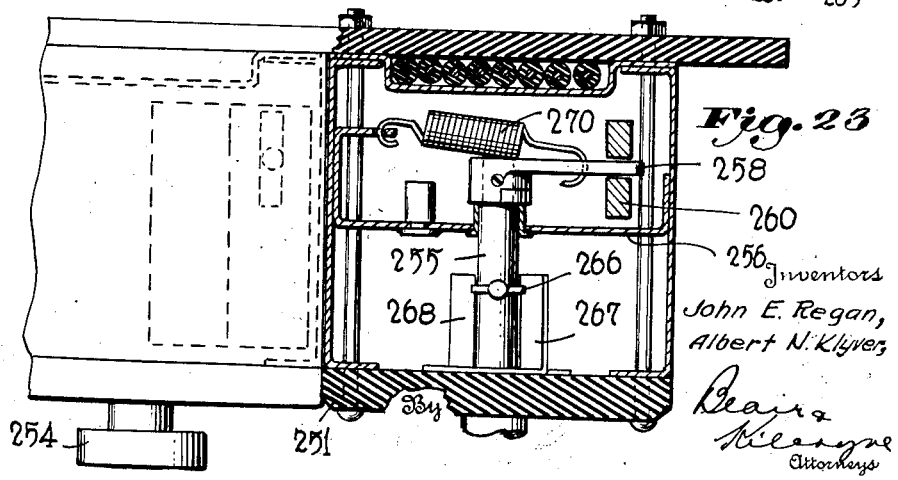

Feb. 9, 1943.  J. E. REGAN ET AL  2,310,461
VERTICAL CONVEYER SYSTEM
Filed June 20, 1941  11 Sheets-Sheet 11

Inventors
John E. Regan,
Albert N. Klyver,
By
Attorneys

Patented Feb. 9, 1943

2,310,461

UNITED STATES PATENT OFFICE 2,310,461

VERTICAL CONVEYER SYSTEM

John E. Regan and Albert N. Klyver, Syracuse, N. Y., assignors to Lamson Corporation, Syracuse, N. Y., a corporation of New York Application June 20, 1941, Serial No. 399,012

32 Claims. (Cl. 214—11)

This invention relates to improvements in vertical conveyer systems.

In vertical conveyer systems of the type now commonly used, loads are dispatched from one of a plurality of dispatch stations, arranged one to a floor on the ascending side of the conveyer, and are delivered to a selected one of a plurtlity of delivery stations, located one to a floor on the descending side of the conveyer. As such systems make no provision for the delivery of loads on the ascending side or for the dispatch of loads on the descending side of the conveyer, loads destined for floors either above or below a particular dispatch station must travel up the ascending side, over, and thence down the descending side of the conveyer to the selected delivery floor. Such systems are further organized so that if the delivery mechanism at the selected floor is occupied or already filled, loads destined thereto are caused to pass the selected floor and to recirculate completely around the system until delivery can be effected. In consequence of such principle of operation, all known systems of the described character are slow and cumbersome in operation and result in a substantial loss of time between dispatch and delivery operations, particularly where the systems serve buildings of ten or more floors. While heretofore suggestions have been advanced to provide a vertical conveyer system overcoming the recognized disadvantages as above discussed, none of them has resulted in a commercially practical, vertical conveyer system, with the result that the prior systems have continued in use, despite their attendant disadvantages and slow service.

The present invention contemplates and provides a unique and improved vertical conveyer system characterized by its ability to give the shortest way service between floors of a building served thereby. In such an improved system loads can be dispatched from any one floor directly to a floor located thereabove, with delivery of the loads being effected on the ascending side of the system, or from any one floor directly to a floor below on the descending side of the system, and from and to a floor located on either the ascending or descending sides, the latter feature providing for recirculation of a load part-way around to a delivery station on the selected floor when the more direct floor delivery mechanism is already filled.

Such improved and direct service is made possible in accordance with the present invention by a system which at each floor employs the four-way service principle, that is, each floor is provided on the ascending side with both a delivery and a dispatch station, one above the other, and on the descending side with a delivery and a dispatch station, also arranged one above the other. Each two floor stations on the ascending side are adjacent the two floor stations on the descending side of the conveyer, as determined by the more or less standard lateral spacing between the up and down runs of a continuously driven conveyer chain, thus to provide on each floor a single, compact station set satisfying the requirements of four-way service to and from each floor.

The invention also aims to provide a vertical conveyer system of the stated character, which is fully automatic in its operation and which at the same time incorporates the necessary safety controls providing for the safe dispatch of loads from any one floor and the sure delivery of loads at the selected floor to which the loads are destined. Accordingly, the system provides a novel organization of station mechanisms at each of the several floors being served by the system, combined with operator-controlled selecting mechanism associated with each dispatching mechanism of a floor, said station and selecting mechanisms being inter-related so that with loads in position for dispatch at a particular floor, and upon the operator setting the selecting mechanism to correspond to the floor to which the loads are destined, the system takes over, so to speak, and the load is automatically transferred to the conveyer which thereupon propels it to the selected floor where automatic discharge of the load is effected. Moreover, the safety controls for each floor set are so organized with the system as to insure that the automatic transfer from the dispatching mechanism of any dispatch station to the conveyer can be effected only when the conveyer is conditioned to receive the load, and that the delivery of a load at any selected floor can be effected only when the delivery mechanism of the latter is in condition to receive the load destined thereto.

For economy in operation and simplicity in construction, the present invention further provides a highly simple yet effective drive for each of the station mechanisms from the conveyer chain. With the latter being driven by a single power source such as a motor, the present arrangement makes provision for driving the several station mechanisms both individually and in positive manner from the conveyer chain only during the intervals of their operation. Hence, with the described arrangement, an appreciable saving of power is effected.

The invention is further characterized by its provision of improved and simplified means for selecting the floor at which delivery of a load or loads is automatically effected, such selecting means being of a character as to be readily set by operators at the several dispatching floors and being further so organized with the conveyer system as to provide effective transfer of the selection to the conveyer and from the conveyer to the delivery mechanisms at the selected floors to which the loads are destined.

A further feature of the invention resides in the provision of means for effecting the multiple dispatch of a plurality of loads either to one selected floor or to a plurality of floors. Such means provides for the setting up of a succession of selections for a succession of loads from any one of the floor dispatching stations, and the successive transfer of the loads from the particular dispatching station to the conveyer as well as the automatic delivery of the loads at a selected floor or at a plurality of floors in accordance with the succession of selections. According to the multiple dispatch principle, the operator sets up the desired succession of selections and, with the system automatically taking over, may thereupon leave the station before all of the loads of the succession thereof are picked up, thus conserving his time for further work.

Other objects will be in part obvious and in part hereinafter pointed out in connection with the following analysis of this invention wherein is illustrated an embodiment of the invention in detail.

In the drawings—

Figs. 1 and 2 are, respectively, broken away side and front elevations illustrating the upper floors of a building serviced by a vertical conveyer system in accordance with the present invention;

Fig. 3 is a condensed view illustrating the general path of the conveyer chain and its disposition within a supporting framework, the upper half being representative of the drive section and the lower half being representative of the take-up section of the framework;

Fig. 4 is a side elevation of one of the cars propelled by the conveyer chain;

Fig. 5 is a front view of the car illustrated in Fig. 4;

Figs. 11 and 12 are plan and side elevation views, respectively, of the station mechanism for the delivery stations on the ascending side of the conveyer system;

Figs. 13 and 14 are plan and side elevation views, respectively, of the station mechanism for the dispatch stations on the ascending side of the system;

Figs. 15 and 16 are plan and side elevation views, respectively, of the station mechanism for the delivery stations on the descending side of the system;

Figs. 17 and 18 are plan and side elevations, respectively, of the station mechanism for the dispatch stations on the descending side of the system;

Fig. 19 is a schematic view of the floor coupled delivery and dispatch stations on the ascending side of the system, including a generalized showing of their mechanisms and the controls for the latter;

Fig. 21 is a front elevation, partly broken away, of one form of multiple dispatch selecting mechanism in accordance with the invention;

Fig. 22 is a broken-away side view of the mechanism illustrated in Fig. 21;

Fig. 23 is a detail in partial section illustrating features of the mechanism illustrated in Figs. 21 and 22;

Figure 10:
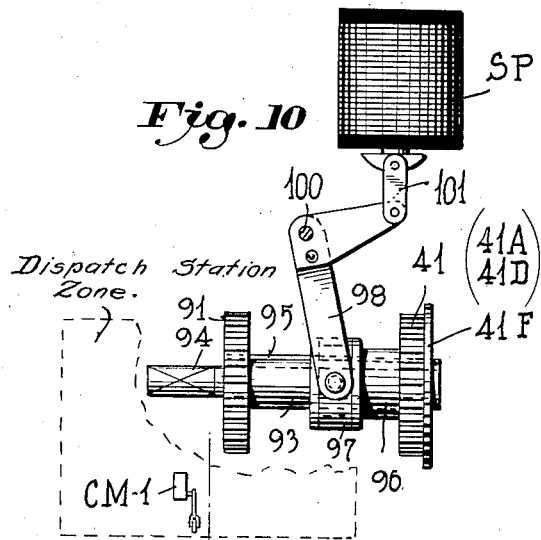
Fig. 10 is a detail of a station pinion and its actuating means.

Referring to the drawings, wherein like reference characters designate like parts throughout the several views, Figs. 1 and 2 represent the three upper floors of a building having 28 floors (including the basement), all floors thereof being served by a vertical conveyer system in accordance with the present invention. The number of floors will of course depend on the particular building and its service requirements, a 28-story building being chosen only for purpose of description.

CONVEYER—GENERAL

The vertical conveyer as generally illustrated in Figs. 1-3, inclusive, is of the type employing an endless uni-strand chain 10 having a vertically arranged ascending run A, and a vertically arranged descending run B. The chain at its upper end travels over a driving sprocket 11, the latter being powered by a driving unit including an electric motor 12, reduction gearing 13, and a driving chain 14. The driving unit is organized in conventional manner with the upper drive section of the framework as illustrated in Fig. 3, the lower end of the conveyer chain 10 traveling around a sprocket 15 carried by the lower take-up section of the framework, the details of which are not here described as they per se form no part of the present invention.

The entire conveyer is supported by and operates within a frame structure of approved construction, which extends vertically within a well or casing provided in the building serviced thereby. The drive and take up sections as generally described are disposed respectively at the upper and lower ends of the frame structure. The relatively forward wall defining the conveyer well is provided at each floor with a single large service opening O, or with a set of four service openings, of which two openings, one above the other, register with the ascending run A of the chain, and the other two openings, also arranged one above the other, register with the descending run B of the chain.

*Load carriers (cars)*

Secured to the chain for travel therewith are a plurality of load carriers C, hereinafter referred to as cars, the details of which are shown in Figs. 4 and 5. Preferably, each car is constituted by a back plate 20, spaced side plates 21 extending forwardly therefrom, each having on its front edge an instruck extension 22, and adjacent each side and secured between the back plate and the side extension piece 22 thereof a horizontal load supporting arm 23. Arms 23 are spaced laterally to provide a load platform, their spacing being somewhat less than the width of the loads to be conveyed, so that a load disposed in the car is supported by the arms thereof along its bottom side corners. The side plate extensions 22 may extend above the level of the load supporting arms to form stops serving to prevent unauthorized movement of a load supported in the car.

Secured against the rear face of the back plate is an upwardly extending and vertically disposed leg 25 preferably of channel formation, the leg being in turn secured to the chain for travel therewith by a bolt 26 extending through the back plate 20 and the leg 25, being secured at its rearward end to the conveyer chain 10.

The cars are guided in their travel with the chain by a pair of spaced tracks 27, 28, each track having a vertical slot providing for movement therealong of the securing bolts 26. The tracks are supported preferably at intervals along their length by yokes 29 (see Fig. 11) or their equivalent secured to the supporting framework and extending into the well, the tracks being suitably spaced as by means of spacing bolts (not shown). A sleeve 31 swiveled on the bolt 26 carries a roller 33 tracking on the edges of the slot of track 28 and side rollers 34 operating between and tracking on both of the tracks 27, 28. At its upper end the vertical leg carries a spindle on which is mounted a swiveled sleeve 35, the latter carrying vertically spaced rollers 36 tracking on the edges of slot of track 27, and laterally spaced rollers 37 operating between and running on both tracks 27, 28.

The top and bottom arrangement of tracks is illustrated in Fig. 3, the extreme ends of the tracks being formed semi-circular and providing two guide passages, the lower one for the car securing bolts 26 and the upper for the upper car spindles which carry the upper swiveled sleeves 35. Means are provided to maintain the car platform (arms 23) horizontal in making the turns, such preferably taking the form of the leveling off arrangement disclosed in the patent to Caeser No. 2,216,685, dated October 1, 1940. According to such an arrangement, each car carries a fixed gear 38 adapted to mesh with planet pinions 38a rolling on upper and lower stationary gears 38b concentric with the chain sprockets.

Hence, by the above described arrangements, the plurality of cars C are propelled by the chain 10 in an endless path as defined by the endless path of travel of the chain. Moreover, the cars are positively guided during their travel both along the vertical chain runs and in making the turns in such manner that the car platforms are maintained horizontal and the cars are restrained against swaying or lateral movement out of the fixed position they are caused to assume by the upper and lower car guiding arrangement as described.

Car actuated rack and pinion drive

Each car carries at one side thereof a vertically disposed rack 40 which is adapted to mesh with station driving pinions generically designated 41, one such pinion forming a part of the drive for each station mechanism. For convenience in description, station pinions for all stations on the ascending side of the system will be designated 41A, and station pinions on the descending side as 41D. The rack at its upper end is provided with a sidewardly disposed, elongated tongue 42 for engagement with one of the two pins 43A carried by each of the pinions 41A, and at its lower end with an elongated tooth 42D for engagement with one of the two pins 43D as carried by each of the pinions 41D. As will be hereinafter described, all station pinions 41 are normally maintained in an inactive position out of line with the car racks 40, but are each individually mounted for movement into alignment with the racks for rotation by the latter and when so rotated, the pinions transmit drive from the chain to the station mechanisms with which they are associated. When a pinion 41A is actuated into line with the rack 40 of an approaching (ascending) car, end tongue 42A of the rack first engages a pinion pin 43A and effects preliminary rotation of the pinion to a position insuring intermeshing without clashing of the rack and pinion teeth upon continued upward movement of the car and rack. Similarly, with the car and its rack moving downwardly, elongated tongue 42D first engages a pin 43D of an active pinion 41D to effect such preliminary turning thereof as is necessary to effect the desired intermeshing of the rack and pinion teeth.

Load tell-tale

Figure 6:
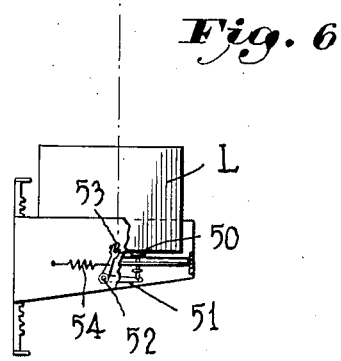
Fig. 6 is a view illustrating the operation of the load tell-tale device with which each of the cars shown in Figs. 4 and 5 are provided.

Each car is also provided with a load tell-tale device such as a plunger 50 mounted for vertical movement in one of the car arms 23, said plunger at its lower end engaging one arm of a bellcrank 51 mounted to turn on spindle 52 carried by the car side plate 21. The other arm of the bellcrank extends outwardly of the car and carries at its free end a roller 53. With the car empty, the plunger is maintained in its "up" position, indicated in Figs. 4 and 5, by a spring 54. In this position roller 53 follows a vertical path of travel, in which are disposed dispatch station devices such as circuit maker CM—1 (Fig. 6) for operation by the roller upon an empty car moving into the station zones. However, when the load L is placed or deposited on the car platform, as indicated in Fig. 6, plunger 50 is depressed, and roller 53 moves out of its normal path of travel thereby to pass the dispatch station devices without operating the same.

Car-carried tab assembly

Figures 7, 8:
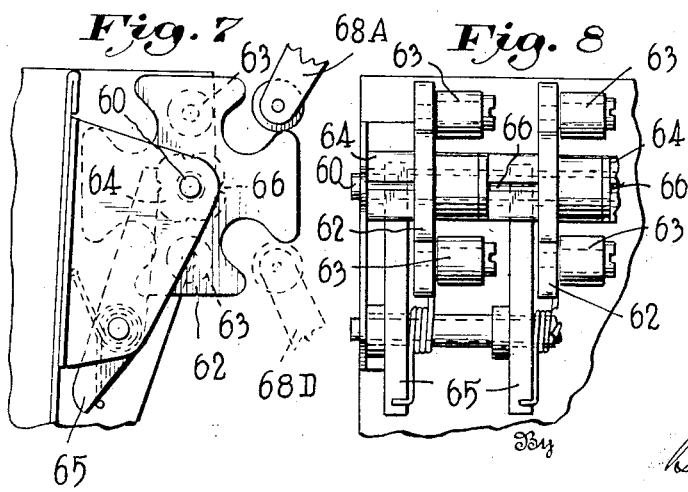
Figs. 7 and 8 are detail views of the tab units of the assembly thereof as carried by each of the cars.

The other side plate 21 of each car carries a tab assembly to which a selection made by an operator at any one of the floors is transferred in automatic manner, as will be described. The tab assembly preferably takes the form of a plurality of tab units (see Figs. 7 and 8) each individually mounted for limited turning movement on a shaft 60 extending between front and rear supporting brackets secured to the car side plate. In the illustrated embodiment, eight tab units are provided for operation in combinations of two, thus to provide 28 selections as required for a system servicing all floors of a 28-story building. It will be understood, however, that the system of the present invention is not limited to tab assemblies operating in combinations of two. For example, a system serving a building having relatively few floors, of the order of eight or less, could use one tab for each floor, while for floors in excess of twenty-eight, the system could use combinations of three tabs. Likewise, base numbers of tabs other than eight, such as six, seven, nine, ten, etc., could be used in single, double or triple settings.

Each tab unit of the assembly thereof preferably consists of an actuator 62 of star-wheel type, each of two oppositely disposed arms thereof carrying a roller 63 and the two rollers being collectively designated as a tab. Each actuator carries a squared bushing 64 for cooperation with a spring-biased holding arm 65. The flat faces of the bushings may each be provided with a notch 66, with the free end of the holding arm carrying a detent adapted for seating therein. The arm 65 is so mounted that its free end bears against a face of the bushing and thereby holds the actuator and hence the tab in the position to which it has been turned.

The actuator 62 of each tab unit of the assembly thereof is adapted to be given a 90° rotation in clockwise direction when the car is ascending, or a 90° rotation in counter-clockwise direction when the car is descending, by a tab setting arm 68 of a bank of eight of such arms, each being individually operated by its own solenoid ST (Fig. 9), said arms and their solenoids forming part of a selecting mechanism associated with each dispatching station of the system. When the solenoids ST are de-energized, the tab setting arms 68 are maintained in retracted position, and the cars and their tab assemblies may travel past without engagement therewith. Assuming two of the solenoids ST to have been energized by the selecting mechanism of a particular floor station on the ascending side of the system, the actuating arms 68A thereof are projected into the line of travel of two of the tab actuators 62. Upon first moving into the upwardly opening slots of the corresponding tab actuators 62 of an approaching car, continued upward movement of the car and its tab assembly past the active setting arms results in a 90° turning movement in clockwise direction of two of the tab units. Such movement of the units causes the tabs 63 thereof to be turned from their neutral to a set or active position in which they are adapted to cooperate with station devices at the selected receiving station, as will be described.

Similarly, with a car and its tab assembly traveling on the descending side of the system, any two of the tab units thereof are adapted to be set or to be given a 90° turning movement, but in a counterclockwise direction, by two of the tab setting arms 68D (Fig. 7) included in the selecting mechanism of each dispatch station on the descending side.

Figure 9:
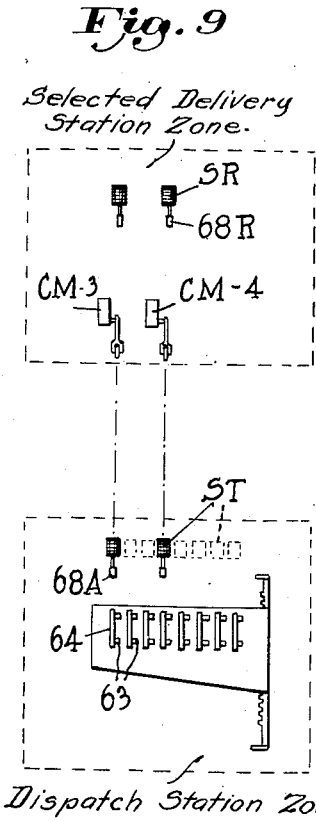
Fig. 9 is a schematic view illustrating the relationship of car tabs, setting means therefor, selected receiving station devices for operation by the set tabs, and the tab resetting devices also located in the zone of the selected receiving station.

According to the present invention, the setting of two tabs of a car in the manner generally described represents a transfer of the operator's selection to the particular car carrying a load destined to a delivery floor which corresponds to the operator's selection. Upon transfer of the operator's selection to the car, the latter moves with the chain until it eventually arrives at the selected delivery station (as generally indicated in Fig. 9) whereupon the set tabs in moving into the station zone operate station devices individual to the selected station, such as the two circuit makers CM—3, CM—4, to effect operation of the delivery mechanism thereof, as will be hereinafter described.

Upon the car tabs being set in active position as aforesaid, they are maintained set by their holding arms 65 until they have operated the station devices of the selected delivery station. To provide for the immediate resetting of active tabs, following such operation, to their neutral position, means preferably comprising resetting arms 68—R are arranged in the station zone of each delivery station, each arm being operated by its own resetting solenoid SR. Like the station devices individual to each delivery station, the tab resetting arms are also individual to each receiving station so that the resetting arms 68—R of a particular delivery station will reset only those tabs which by their previous setting have effected actuation of the delivery mechanism at that station. To this end, resetting arms 68—R of each delivery station have the same relative position as the station devices (circuit makers CM—3, CM—4) for that station. Like the setting arms 68—A and 68—D, the resetting arms have an inactive position in which they are disposed out of the path of the tab actuator 62 of any of the tab units of a car assembly thereof. However, upon the tab resetting solenoids of a delivery station being energized, such occurring after actuation of the delivery mechanism at that station, as will hereinafter appear, the resetting arms are projected to their active position and, upon movement of a car past the same, the actuators 62 of the previously set tabs are given a further 90° turning movement, thereby to return the tabs to their neutral position. Thereafter, the tabs are held in neutral position by their holding arms 65 until they are again positively set to their active position.

Thus, by the two-way construction and operation of the tabs as aforesaid, the tabs can be set by limited turning movement in the same direction. Moreover, the tabs are so constructed and operated that they are universal to both ascending and descending car movement.

*Typical floor set*

In addition to the more or less conventional arrangement of a dispatch station located on each of the floors on the ascending side and a delivery station located on each of the floors on the descending side of the system, the present invention provides a delivery station for each floor on the ascending side and a dispatch station for each floor on the descending side of the system. Thus, each floor excepting the top and bottom floors, as will be discussed hereinafter, is served by four stations, with the system giving four-way servcie on each floor through a floor station arrangement generally illustrated in Figs. 1 and 2. As shown, the four stations for each floor are organized into a compact floor set, with each delivery station on the ascending side of the system being disposed below the related dispatching station on the same floor, so that a car which has delivered its load to a selected delivery station can be reloaded at the dispatching station immediately above it on the same floor. On the descending side of the system, each delivery station is disposed above its related dispatch station on the same floor so that a car upon delivery of its load to a selected delivery station is immediately available for reloading at the dispatch station immediately below it. The sideward disposition of the delivery and dispatch stations of a floor set thereof is determined by the horizontal spacing between the ascending and descending runs of the conveyor chain. This distance is more or less standard and is such as to permit of the compact locationing of the floor stations for each floor set. While the aforesaid arrangement provides maximum capacity, the invention is of course not so limited, as obviously a station floor set arrangement in which on the ascending side the dispatch station is disposed below the delivery station offers marked advantages for a particular installation or for certain floors thereof. Such an alternate arrangement, in which the two dispatch stations of a floor set are at the same level, which is below that of the delivery stations, represents the best arrangement where convenience in loading levels is an important consideration.

While all of the intermediate floors are equipped with the four-way floor set as described, the basement and top floors do not require this arrangement. For these extreme points of service, one dispatch station and one delivery station, preferably located on the descending side of the conveyor will suffice, because an operator on the top (or basement) floor would not ordinarily dispatch a load to a delivery station located on the same floor. If desired, the delivery service stations at the top and bottom floors may be fixed so as to effect the unloading of all loaded cars reaching these extreme floors.

*Delivery stations for ascending side*

Inasmuch as all of the delivery station mechanisms on the ascending side of the system are of identical construction, only one such mechanism will be described.

Referring to Figs. 11 and 12, each of the delivery stations include station mechanism employing an unloading member movable upwardly in an arcuate path which intersects the vertical path of travel of the ascending cars. By properly timing its operation in relation to car travel and by causing it to move at an angular speed which is greater than the linear travel of the cars, the unloading member passes upwardly between the spaced arms 23 of the traveling car and, in so doing, picks off a load therefrom and thereupon moves it out of the path of the car and delivers it on to the station incline.

In the illustrated embodiment, the arcuately moving unloading members takes the form of a rotary arm 70 formed by side plates 71 which are suitably secured in spaced parallel relation. The rotary arm is journaled for rotation about the axis of a shaft 72 mounted in suitable bearings in the station framework, the arm being driven independently of said shaft by a drive sleeve 73 carrying the driven gear 74 of a gear train to be described. The operating surface of the rotary arm is provided by a conveyer belt 75 traveling on end rolls 76, 77, one of which (77) is continuously driven, as will be described, the belt traveling on intermediate sustaining rollers 78.

As indicated in Fig. 11, wherein the rotary arm is shown in the substantially horizontal position which it assumes at one point in its arcuate movement, the width of the arm 70 is less than the spacing between the load supporting arms 23 of the car, and its radius of turn is somewhat less than the distance between the car back plate 20 and the axis of shaft 72. Thus, as the arm is given a 180° rotation from its vertical or neutral position shown in Fig. 12, one end of the arm travels relatively upwardly through the car without engaging the latter and, in so doing, is adapted to lift therefrom a load supported therein on the arms 23.

As illustrated in Fig. 11, the other end of the arm during its movement as aforesaid is adapted to move between the spaced runs 80, 81 of a take-off conveyer of the belt type, the runs extending between relatively inner pulleys 82, one of which is keyed to the shaft 72, and the relatively outer pulleys 83 carried by a shaft 84 mounted in suitable bearings in the framework. Thus, with shaft 72 driven continuously in a clockwise direction, the spaced runs 80, 81 of the take-off conveyer are continuously driven from left to right. The belt surfacing 75 of the rotary arm 70 is also continuously driven from left to right (Fig. 11) through the medium of a driving pulley 86 keyed to the shaft 72 and which effects drive of a belt 87, the latter in turn driving the end roller 77 of the rotary arm. Hence, as the rotary arm lifts off a load from a car, its traveling belt 75 moves the load along the arm as the latter continues its arcuate movement and delivers the same to the take-off belts 80, 81, which further move the load to the right. Preferably the take-off runs 80, 81 deliver the load to a station incline 85 (Fig. 19), preferably of the gravity roller type, of sufficient length as to permit of a limited accumulation of loads thereon.

Means are provided for positively driving the rotary unloading arm throughout its 180° movement as aforesaid from the conveyer chain, and to this end gear 74 which powers the driving sleeve 73, and hence the rotary arm 70, is preferably driven by a train of gearing including an intermediate gear 90 meshing with a driving pinion 91. Gear 90 is carried by a stub shaft 92 journaled for rotation in the station framework. By reference to Fig. 10, pinion 91 is keyed to a sleeve 93 rotating on shaft 94. Keyed to the sleeve 93 for rotation therewith by a key 95 is an outer sleeve 96 having limited axial movement on the inner sleeve 93. The sleeve 96 at one end carries the station pinion 41 and at its other end an actuating collar 97, relative to which the sleeve 96 is freely rotatable. The collar 97 is carried by the spaced arms of a yoke 98 constituting one arm of a bellcrank fulcrumed for turning movement about the fixed axis 100. The other arm of the bellcrank is connected to the plunger 101 of a normally de-energized station solenoid SP, one such solenoid being coupled with the station pinion 41 for each station. With solenoid SP de-energized, plunger 101 assumes its dotted line position indicated in Fig. 5 and, through yoke 98, maintains pinion 41 in its inactive position indicated in dotted lines, in which it is disposed sidewardly of the path of travel of the car racks 40. Upon energization of the station solenoid SP, plunger 101 is retracted and effects turning movement of a bellcrank in a counterclockwise direction and consequent axial movement to the right of outer sleeve 96 and pinion 41 carried thereby. This movement is such as to bring pinion 41 into its active position in the path of travel of the car racks 40, and the next ascending car effects rotation of the pinion 41, sleeve 93, and pinion 91 carried thereby. The rotation of the latter is transmitted to the rotary arm 70 through intermediate gear 90, driven gear 74, and driving sleeve 73.

To maintain station pinion 41 in its active position throughout the full interval of rack engagement therewith, even though its solenoid SP is only momentarily energized, the station pinions are each provided with a flange 41F adapted, when the pinion is moved to its active position, to hold the pinion and rack in mesh until the rack has run off the pinion. The length of the rack and the gear ratios of the driving gear train are chosen to provide 180° rotation of gear 74 and hence of the unloading arm for every complete engagement of a car rack 40 and station pinion 41. Moreover, operation of the unloading arm is so timed that upon moving under an ascending car it will pass upwardly through the arms thereof at about the instant the car arms 23 and the unloading arm are in the same horizontal plane. By moving the arm at an angular speed which is greater than the linear speed of the car, the arm lifts the load off the car during continuous movement of the latter.

It will be seen, therefore, that the unloading arms 70 of the delivery stations on the ascending side of the conveyor are positively driven upon movement of their station pinions into active position in which they mesh with car racks 40, and that movement of each of the station pinions can be effected by the relatively simple expedient of energizing a solenoid associated with each pinion. The station pinions thus serve as a normally disengaged drive connection between the chain and the unloading arm operating means.

Preferably, the unloading arm belt 75 and the take-off runs 80, 81 are continuously driven from the chain by the means shown in Fig. 11, wherein a sprocket 105 is mounted to mesh with the chain 10 for drive thereby. The sprocket is keyed to a stub shaft 106 driving the bevel gears 107, 108 mounted in a suitable gear box carried by the framework and to the rear of the station, the bevel gearing serving to drive pulley 109 for a belt 110, the latter in turn driving a pulley 111 keyed to the shaft 72. Thus, the movement of the conveyor chain is transmitted to the arm belt 75 and the runs 80, 81 of the take-off conveyor.

*Dispatch stations for ascending side*

As in the case of the delivery station mechanisms, all dispatching stations on the ascending side of the conveyer employ like mechanism and accordingly only one such mechanism will be described. Referring to Figs. 13 and 14, each dispatching station preferably incorporates a station incline 115 which is sufficiently long so as to provide space for an accumulation of loads to be dispatched, for example six loads, and from which the loads are successively fed on to a traveling carriage generally designated CA. The carriage is preferably formed by spaced side channels 116, 117 carrying depending wheel mounts for the wheels 118 adapted to run on channel rails 120 fixedly supported from the station floor and extending from a point well under the station incline 115 to a point within the conveyor well. Secured to the carriage side frames 116, 117 in an extension frame 122, the side members of which carry a plurality of load supporting rollers 123. At its relatively inner end, the carriage is provided with a load stop 124. The extension side members also provide a mounting for a cross rod 126, the latter extending well beyond the sides of the carriage as indicated in Fig. 13. Secured to each end of the cross rod 126 is a link 127, and to the free ends of each link is secured an actuating arm 128, said arm being keyed to a rock shaft 130 suitably journaled in the station framework and extending from side to side of the mechanism. Also keyed to the rock shaft 130 is a crank 131 connected by a pull link 132 to a crank 133 turning with a shaft 134 driven by a gear 135.

In its retracted position, as determined by the dotted line position of the actuating arm 128, the carriage proper extends beneath the station incline 115 and its extension portion which is inclined to the horizontal forms in effect a continuation of the incline. The arrangement is such that upon rotation of gear 135 the carriage and its extension are actuated throughout its cycle of movement from its retracted position aforesaid to a load transfer position with reference to an ascending car, and back to its retracted position. In its transfer position, the extension portion of the carriage extends into the vertical path of movement of the car, it being noted from Fig. 13 that the width of the carriage extension is less than the space between the supporting arms 23 of the car. Moreover, the throw of actuating arm 128 is such as to actuate the carriage extension to a position short of the back plate 20 of the car. Hence, a load positioned on the carriage extension in the transfer position of the latter is picked up by an empty ascending car. Thereafter, the empty carriage returns to its retracted or inactive position, and the car and its load is propelled by the chain to the selected delivery station.

To insure step-by-step feed of single loads to the carriage from an accumulation of loads positioned on the station incline for dispatch and, moreover, to prevent unintentional advance feed of the loads on the incline to the carriage, stop means organized with the movement of the carriage are provided. To this end the station incline 115 carries at its relatively inner end a cross shaft 140 mounted for rocking movement, to each end of which is secured an upwardly extending finger 141. The rock shaft 140 also fixedly carries a front stop arm 142 and a rear stop arm 143, each provided with end rollers. The carriage CA is provided at each side thereof with a bracket 144 carrying an outwardly directed pin 145. In the retracted position of the carriage, the pins 145 engage against fingers 141 and thereby maintain rock shaft 140 in a position such that stop arm 142 is relatively raised and stop arm 143 relatively lowered. Hence, with the carriage in retracted position, the end roller of stop arm 142 is in its raised position and engages against the relatively front face of the endmost load designated L¹, thereby acting as a stop for the accumulation of loads on the station incline.

As the carriage begins its movement to active position, pins 145 move away from fingers 141 and shaft 140 is rocked in counter-clockwise direction. Arm 142 is accordingly lowered and arm 143 is raised, and the end-most load L¹ is free to roll by gravity on to the carriage CA, it being understood that the carriage is thereby loaded as its operating cycle is initiated.

Raising of arm 143 brings its end roller in position to act as a stop for the next load L² of the series thereof on the incline, forward movement thereof being further retarded by a friction brake 144 which moves from a lower, disengaged position into engagement with the rollers of the station incline in response to rocking movement of the shaft 140 as aforesaid. This movement of the brake is effected through an arm 146 carried by the shaft 140, a push link connection 147, and a bellcrank 148 actuated by the latter and having its free end connected to the brake 144.

The carriage is also provided with resiliently mounted fingers 150 carried by the cross rod 126, such fingers having sloped rear portions permitting a load to ride over the same but returning to their up-position in which they function to prevent any unintentional rearward movement of a load upon its positioning on the carriage extension.

Upon transfer of the load from the carriage to the car and return of the carriage to its retracted position, pins 145 engage fingers 141 to effect lowering of stop arm 143 and raising of stop arm 142, whereupon the load L², which was held by the arm 143 during substantially the complete cycle of movement of the carriage, advances to the position of load L¹ in which it engages the roller of stop 142. Simultaneously with the lowering of stop arm 143 the brake 144 is disengaged from the rollers of the station incline so that they are free to turn with the advancing loads.

As with the delivery mechanism on the ascending side of the system, all dispatching mechanisms are positively driven throughout their cycle of movement from the conveyer chain through the medium of the car rack 40 coming into engagement with the station pinion 41 upon the latter being moved into position in alignment with said rack. Referring to Figs. 13 and 14, the station pinion 41 transmits drive from the chain to pinion 150, which in turn drives intermedate gear 151 meshing with gear 135. Gear ratios are so selected that engagement of car rack 40 and station pinion 41 results in one complete rotation of gear 135, thereby to operate the carriage actuating arm 128 throughout its complete cycle from a retracted, dotted line position to the full-line position illustrated, and thence back to its retracted position.

Delivery stations for descending side

As all of the mechanisms for effecting delivery of loads on the descending side of the system are of identical construction, only one such mechanism will be described. Referring to Figs. 15 and 16, each delivery station is provided with a fixed station incline 155 adapted to discharge loads transferred to a traveling carriage CA—1 by the conveyer at that station. The station carriage is preferably constituted by spaced side channels 156 carrying wheel mounts for the wheels 157 adapted to run on fixed station tracks 158. The carriage has an extension 159 provided with load-supporting rollers 160, the carriage extension being arranged at an inclination such that when the carriage is in its retracted position the inclined extension thereof forms a continuation of the fixed station incline 155. In such retracted position the carriage proper is disposed beneath said station incline.

The carriage CA—1 is actuated to and from its unloading (load transfer) position in which, as in the case of the traveling carriage of the dispatch station mechanism on the ascending side, its extension extends into the vertical path of movement of the descending car. Similarly, the carriage extension is dimensioned so that it may extend into the space between the load-supporting arms of the car without interference therewith and, in such operative position, is adapted to receive from the car a load positioned thereon as the car continues in its descending path of movement.

To actuate the carriage throughout its cycle of movement, the carriage is provided with a cross rod 162 connected at each end by links 163 to an actuating arm 164 fixedly carried by a rock shaft 165. The latter is rocked by a crank 166 connected through a link 167 to a crank 168 fixed on shaft 169 which is in turn driven by gear 170. In its retracted position the arm 164 assumes the dotted line position illustrated in Fig. 16, its operative position being illustrated in full lines. In order to preclude unauthorized movement of a load delivered to the carriage by the car during the interval that the car is moving to its retracted position, load stops 171 are provided, such being mounted for turning movement on cross rod 162 and being biased to a relatively raised position in which they are adapted to prevent gravity movement of a load from the carriage. The stops 171 are each organized with a release arm 172 extending sidewardly of the carriage and which carries at its end a roller adapted upon the carriage moving to its full retracted position, to be engaged by fixed lugs or abutments 173 at the relatively inner end of the station incline. When so engaged, the lugs 173 turn the arms 172 in a counter-clockwise direction, and hence depress the stops 171. Upon depression of the stops, which occurs only when the carriage is in its retracted position, the load disposed on the carriage is free to roll by gravity on to the station incline 155.

As in the case of the station mechanisms of the delivery stations on the ascending side, each delivery station mechanism on the descending side is positively driven from the conveyer chain through engagement of the car rack 40 with the station pinion 41. Rotation of the station pinion effects rotation of a driving pinion 174, an intermediate gear 175, and the previously referred to gear 170. Gear ratios are selected so that engagement of the rack 40 and station pinion 41 results in one complete rotation of gear 170, thus to actuate arm 164 through a complete operating cycle from its retracted position to its operative position and thence to its retracted position.

Dispatch stations for descending side

As the station mechanisms for all dispatch stations on the descending side of the system are identical, one such mechanism only will be described in detail. Referring to Figs. 17 and 18, the mechanism employs a car loading member which is mounted for movement in an arcuate path which intersects the vertical path of car travel. The loading member as shown takes the form of a rotary arm 180, generally the reverse of the rotary arm 70 of the delivery mechanism on the ascending side of the system, in that it is given 180° counter-clockwise rotation from its neutral vertical position. During this counter-clockwise movement the arm is adapted to deposit a load on the supporting arms of a descending car between which the rotary arm moves, and thereupon returns to a neutral position out of the path of car travel.

The arm 180 is formed by side plates 181 secured in spaced, parallel relation and its surfacing is provided by a continuously driven belt 182 traveling over end rollers 183, 184, and intermediate rollers 185. The arm turns about the axis of a continuously driven shaft 186 journaled for rotation in the station framework and is itself driven by a driving sleeve 187 disposed on the shaft and which is keyed to the driven gear 188 of a gear train to be described. One end of the rotary loading arm is adapted to pass between the spaced runs 190 of a feed-in belt which lines up with and is adapted to receive loads from a station incline 192. The feed-in runs are continuously driven from the shaft 186, one belt running over a pulley fast on said shaft and transmitting drive to the other belt through the shaft 194.

Means providing for the step-by-step advance of loads accumulated on the station incline 192 are organized with the rotary loading arm for actuation thereby in response to arm movement, such preferably including oppositely disposed stop-operating cams 196 carried by the driving sleeve 187 of the arm for rotation therewith. Each of the cams has an offset portion 196A and an arcuate portion 196B. A cam roller carried by a bellcrank 197 engages against the offset portion 196A of the cam when the loading arm is in its neutral position. The bellcrank is connected by a link 198 to a second bellcrank 199 fulcrumed for turning movement in the station framework. One arm of the latter bellcrank is adapted to extend above the upper run of the feed-in belts 190, when raised by engagement of cam roller with offset portion 196A of the cam 196, and functions as a stop for loads positioned on the station incline, the relatively endmost load being carried on the feed-in belts. Upon initiation of arm movement the arcuate cam portion 196B depresses the cam roller, thereby to lower the stop, whereupon the endmost load is carried relatively inwardly by the feed-in belts 190. Continued rotation of the loading arm results in the cam roller riding off arcuate surface 196B whereupon the stop is elevated to a position in which it stops further advance movement of the loads on the station incline.

Means for braking the advance movement of loads positioned on the incline during the interval of lowering of the stop is also provided, such preferably comprising a brake section 202 normally positioned out of braking engagement with the end rollers of the incline but adapted to be moved into braking engagement therewith upon release of the stop through a connection with the latter which may comprise arm 203, link 204, and bellcrank 205.

The loading arm 180 is adapted to be given a 180° rotation through a gear train including a pinion 208 and an intermediate gear 210 meshing with the sleeve driving gear 188. Pinion 208 is adapted to be driven upon rotation of the station pinion 41 by the rack 40 of a descending car.

Shaft 186 is continuously driven from the chain through a belt 212, in turn driven by a sprocket 213 in continuous meshing engagement with the conveyer chain 10.

*Selecting mechanism—Single dispatch*

In furtherance of the aim of the present invention to provide a fully automatic intercommunicating conveyer system, means are provided by which an operator at any one of the dispatch stations is enabled to select the particular delivery station at which delivery of loads being dispatched is effected in automatic manner. The operation of either type dispatch station as described consists in disposing a load on the station incline where it will automatically flow to a stop position. The operator then sets a selecting mechanism associated with the dispatch station to a position corresponding to the delivery station desired. The first empty car approaching the dispatch station operates its station mechanism, the load is picked up by the car, and the operator's selection is transferred to the car, all in automatic manner. Thereupon the loaded car passes to the selected delivery station where the selection previously transferred to the car initiates operation of the delivery station mechanism and effects transfer of the load from the car thereto.

As the present system employs selecting mechanism which is organized to operate in conjunction with each dispatch mechanism, with the selection in turn initiating operation of the delivery mechanism at the selected floor, the operation of a typical dispatch mechanism and a selected delivery mechanism will be combined with that of the selecting mechanism in the following description. Moreover, there will first be described a selecting mechanism operating on the single dispatch principle, according to which a selection of a succession of loads is made as a preliminary to the dispatch of each load thereof, with the operator standing by for the total interval required for the dispatch of the succession of loads.

First considering the operating requirements of any one of the dispatch mechanisms, such is dependent upon the fulfillment of the three system conditions as follows: (1) That an empty car, as distinguished from a loaded car, is approaching the station from which a load or loads are to be dispatched; (2) that a load is in position on a station incline for dispatch; and (3) that a selection is made by the operator.

Referring to Fig. 19, an empty car in approaching a typical dispatch station on the ascending side of the system is shown as having moved from a full to a dotted line position. During such movement, the load tell-tale of the car, which for purpose of clarity is shown on the car back plate rather than on the car side as shown in Figs. 4 and 5 is in its active position and has engaged the circuit maker CM—1. The latter is positioned in the station zone, being connected in a supply conductor 220 in turn connected to one side 221 of the supply mains. Also connected in the conductor 220 is a circuit maker CM—2 arranged to be contacted by a load ready for dispatch on the station incline.

Connected in series with CM—1 and CM—2 by a conductor 222 is a dial type selector device which, as shown, may take the form of an insulated dial plate 223 having a conductive dialing arm 224 to the inner end of which the conductor 222 is electrically connected. The dialing arm is shown in its zero position (corresponding to a basement floor setting) but may be manually turned to any one of twenty-eight positions, each of which designates a floor at which delivery may be effected. The floor designations are such as would be carried by a selector associated with the dispatch mechanism for the first or basement floor of a 28-story building. For intermediate floors the zero position of the dial arm preferably corresponds to the floor at which the particular selecting device is located, with the floor designations starting with the number of the next above floor.

The arrangement is such that, upon the dial arm being moved to any one of the floor designations, parallel circuits are completed through a combination of two of the eight tab setting solenoids ST of the station bank thereof as arranged in the zone of each dispatching station. This may be effected by providing two contact pins at each station designation of the dial plate, each of such pins being electrically connected by a conductor generically indicated 225 to one of two tab setting solenoids ST corresponding to the particular dial arm setting. Hence, as the dial arm 224 is moved to a floor designating position, current flows through conductors 220, 222, the selecting device, two of the solenoids ST, and a common return conductor 226 connected to the other side 227 of the supply mains. Connected in the return conductor is the station solenoid SP adapted, when energized, to actuate the station pinion 41A into line with the rack 41 of the car. It will be understood that each dispatch station is provided with its own control circuit as aforesaid and that the several control circuits are connected in parallel across the supply mains 221, 227.

With the car in its dotted line position and the carriage CT in its operative position following completion of the first half of the operating cycle thereof, it will be understood that a circuit has been completed across circuit makers CM—1, CM—2, the selecting device, two solenoids ST, and station solenoid SP, that the station pinion 41 has moved to its active position, and that the car rack 41 has completed one-half of its engagement therewith, the latter having resulted in movement of the carriage throughout the first half of its operating cycle. Upon further ascending movement of the car, the latter picks off the load from the carriage, whereupon the latter, due to continued rack engagement is operated throughout the latter half of its cycle and is thereby returned to its retracted position.

The circuit maker CM—2 is preferably so positioned that it is initially closed by a load positioned on the station incline for dispatch, and may be thereafter maintained closed for the interval of carriage actuation. While the period of energization of the solenoid SP and hence of the selected two of the solenoids ST is necessarily brief, due to the relatively rapid rate of car travel, this period can be enlarged by providing a relatively long wiping engagement between the car tell-tale and the circuit maker CM—1. In any case, proper timing of solenoid energization, apart from the duration thereof, effects initial engagement of car rack and station pinion whereupon the pinion flange 41F maintains the desired intermeshing engagement until the rack of the ascending car runs off the pinion.

As the car passes the two energized tab-setting solenoids ST, two tabs of the car assembly thereof are turned to their set position by the solenoid actuated setting arms 68A. It will be understood that the two car tabs are set according to a definite combination related to the particular receiving station to which the load being dispatched is destined.

With load dispatch as well as the transfer of the operator's selection to the car bearing the dispatched load having been effected, the car eventually moves into the zone of the station to which the load is destined. For delivery of the load at the selected station, two system requirements must be satisfied: First, the car tabs must cooperate with station devices individual to the particular receiving station and, second, the load-receiving incline at that station must have space available for the load. To satisfy the first condition there is provided in each receiving station zone (on the ascending side) a pair of circuit makers CM—3, CM—4, the spacing between which is individual to the particular station. Said circuit makers are adapted to be wiped by the two tabs which have been set to active position by the dispatch station-selecting mechanism and are series connected in the supply conductor 230 in turn connected to the supply main 221. To satisfy the second condition, a plurality of circuit breakers, of which the three designated CB—1, CB—2, and CB—3 are shown, are connected in parallel across conductor 230 and the return conductor 231 to the other side 226 of the supply mains.

Preferably, the circuit breakers CB—1, CB—2 and CB—3 are arranged at spaced intervals along the receiving station incline, which is of length as to provide storage space for a chosen number of loads such as six loads. With a full complement of loads on the incline, all of the parallel circuits containing the circuit breakers are open. But if no load is disposed over any one of the circuit breakers, indicating sufficient space on the incline to receive at least one additional load, current flows through conductors 230, 231. Connected in the return conductor 231 is the station solenoid SP which, upon energization, actuates the station pinion 41A into line with the rack 40 of the ascending car. For the ascending side of the system, rotation of station pinion 41A imparts rotary movement to the unloading arm 70 in a clockwise direction, with the arm swinging in under the load, lifting the same from the car and thereupon, during the latter half of its cycle, depositing the load on the station incline. The positioning of the circuit makers CM—3 and CM—4 is such as to properly time the operation of the unloading arm in relation to car travel.

The rotary arm at each end thereof is provided with a shoe 232, the lower of which in the neutral position of the arm engages circuit breaker CB—4. As the arm moves out of its neutral position, the arm shoe 232 moves away from circuit breaker CB—4 and a circuit through supply conductor 233 and a return conductor 234 is completed. Series connected in conductor 234 are two tab resetting solenoids SR—1 and SR—2 for the station resetting arms 68—R, which latter are in vertical alignment with the circuit makers CM—3 and CM—4 of the particular station. When solenoids SR—1 and SR—2 are energized, their associated resetting arms 68R are projected into the path of the previously set tabs and effect resetting thereof to their neutral position. The tab resetting solenoids for each delivery station are disposed in the station zone above the circuit makers corresponding to CM—3 and CM—4, and thus the car tabs are reset only after they have initiated the operation of the delivery station mechanism. Following resetting of the tabs, the empty car is available for immediate reloading at the floor coupled dispatch station just above the station at which delivery was effected.

To provide for a condition in which a selected delivery station on the ascending side of the system is unable to accommodate the load destined to it from a dispatch station therebelow, as for example where no storage space is available on the station incline of the selected receiving station, the circuit makers corresponding to CM—3, CM—4, of the same floor delivery station on the descending side of the system are correspondingly spaced and positioned in the zone of the latter station. Thus, a loaded car passing the selected receiving station on the ascending side of the system without actuation of the station mechanism thereat is carried over to the delivery station at the same floor on the descending side of the system to operate the mechanism of the latter station.

Figure 20:
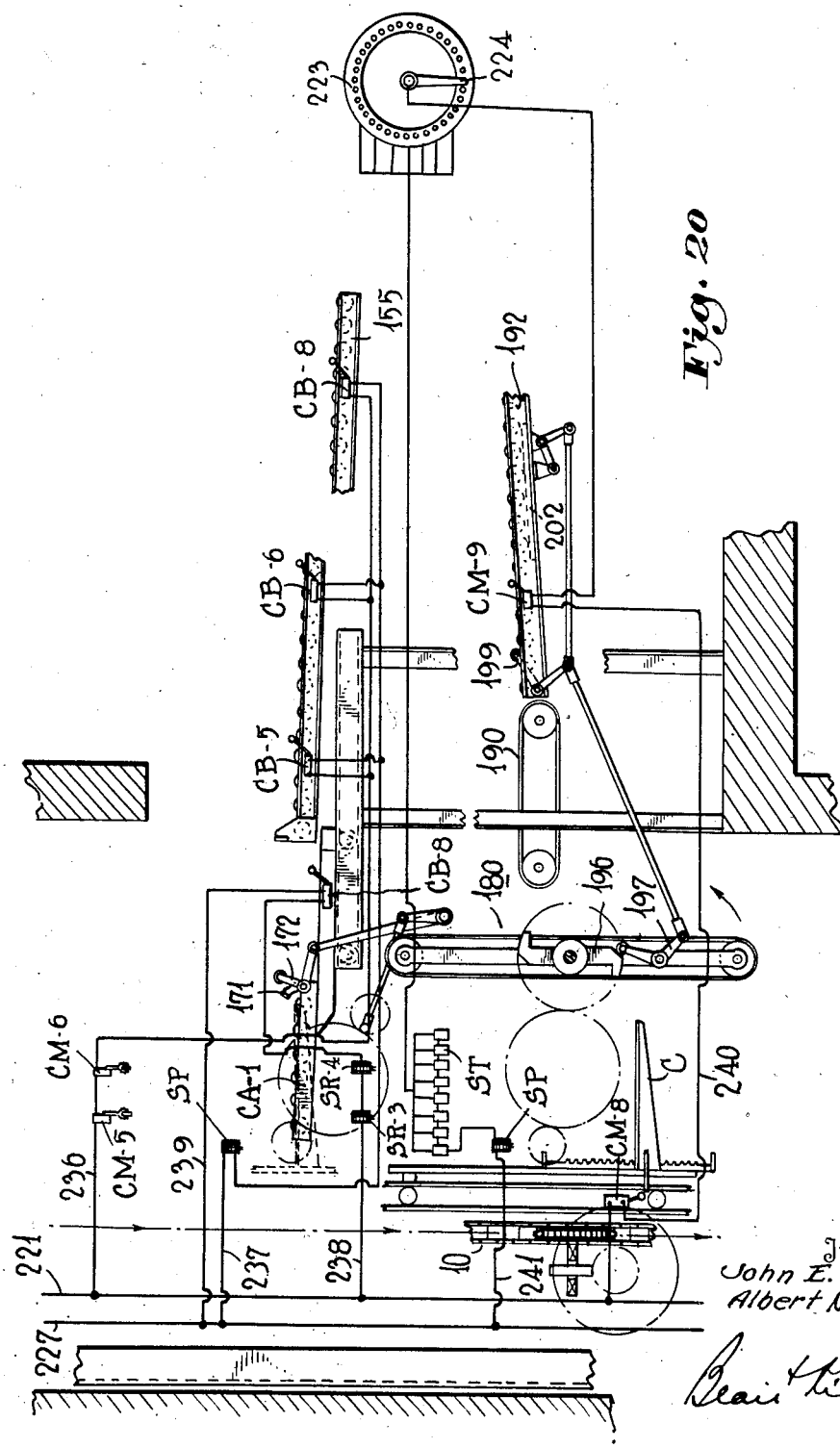
Fig. 20 is a like view of the floor coupled delivery and dispatch stations on the descending side of the system.

Referring to Fig. 20, the operation of the delivery mechanisms of stations on the descending side of the system is similar to that of the delivery mechanisms on the ascending side, with the difference that the delivery mechanisms on the descending side employ reciprocating carriage type unloaders, rather than rotary-arm type unloaders. Thus, upon a descending car moving into the zone of the selected receiving station, either from a dispatch station located thereabove, or from a lower level dispatch station on the ascending side of the system, the two car tabs which have been set in accordance with the operator's selection engage the series connected circuit makers CM—5, CM—6, thus to complete a circuit though the return and supply conductors 236, 237 connected across the supply mains 221, 227, this under the assumption that at least one of the circuit breakers CB—5, CB—6, CB—7, is disengaged by loads accumulated on the receiving station incline. The station solenoid SP is connected in the return conductor 237 and, upon being energized, actuates station pinion 41D into line with the car rack 40, thereby to actuate the station carriage CT—1 throughout its operating cycle. The tab resetting solenoids SR—3, SR—4, are energized upon the car descending to the level thereof, the latter being series connected in a supply conductor 238, in which is also connected circuit breaker CB—8. The latter is adapted to be engaged by the carriage CT—1 when in its retracted position and operates to complete a circuit across conductor 238 and a return conductor 239 upon movement of the carriage from such position. When the circuit is completed as aforesaid, solenoids SR—3, SR—4, are energized, and the resetting arms 69—R effect resetting of the previously set tabs. Thus, as the car moves downwardly out of the station zone, it is available for loading at the dispatch station of the same floor unit.

Dispatching on the descending side of the system is effected in manner substantially similar to dispatching on the ascending side, with the difference that a rotary type loader is employed rather than a loader of the traveling carriage type. With an empty car moving into the zone of a dispatch station on the descending side, circuit maker CM—8 is engaged by the car tell-tale. Assuming a load on the station incline ready for dispatch, circuit-maker CM—9 is closed thereby, the latter being series connected with CM—8 in a supply conductor 240. Upon the operator making the selection a circuit is completed through conductor 240, the selecting device, two of the tab setting solenoids ST, and the return conductor 241. The station solenoid SP is connected in the return conductor 241 and, when energized, actuates the station pinion 41D into line with the rack 40 of the descending car, thereby to drive the rotary loading arm through its 180° arcuate movement in counter-clockwise direction. During the latter, the arm moves down over and deposits a load on the car. As the car moves through the station zone, two tabs thereof corresponding to the operator's selection are actuated to their set position, whereupon the loaded car moves onwardly to the selected delivery station, with delivery being there effected in the manner above described.

Instead of the dial type selector above described, a push button-type selecting means operating on the single dispatch principle may be employed. A push button selector, like the dial type, operates on the principle requiring that a floor selecting button be pushed preliminary to each operation of the dispatch mechanism with which it is associated.

*Selecting mechanism—Multiple dispatch*

In addition to the single dispatch of loads provided by the afore-described selecting means, the present invention also provides a receiving station selecting mechanism operating on the principle of multiple dispatch of loads. The term "multiple dispatch" is employed to designate selecting mechanism by which an operator at a dispatch station who has a succession of loads ready for dispatch may place the same on the station incline and immediately make a succession of selections, in number corresponding to the loads to be dispatched. Thereupon the operator may leave the station as, according to the principle of multiple dispatch, he is under no requirement to make a selection preliminary to each dispatch operation. On the other hand, with the succession of selections having been made, approaching empty cars successively pick up the loads, and the selecting means operates to transfer in automatic manner the succession of selections to the succession of cars.

In the multiple selecting mechanism to be described, provision is made for six successive selections, the number six being representative of the maximum number of loads an operator would be required to dispatch at one time. However, the arrangement is capable of being added to as required to provide for a greater number of selections. It is here noted that a lesser number of selections as required by an operator at one floor having only three loads to dispatch, for example, does not change the operation of the apparatus providing for six successive selections.

Referring to Figs. 21, 22 and 23, wherein a multiple selecting mechanism in accordance with the invention is illustrated, reference character 250 indicates a rectangular box provided with six vertical compartments each being enclosed or faced by a vertical panel 251. At the top of each panel is disposed a bull's-eye 252, the latter being numbered from 1 to 6 to correspond to the six selections permitted by the mechanism. On each panel is disposed a vertical row of eight finger buttons 254 shown to be of the rotary type, the buttons being numbered from 1 to 8, the numbering thereof corresponding to the number of tab setting solenoids ST of a station set or bank thereof.

Each vertical row of buttons is in the nature of a unit assembly and, as the six unit assemblies are of identical construction, only one thereof will be described in detail. The rotary buttons 254 of a row are each carried by a shaft 255 journaled for rotation in the panel 251 and an intermediate cross strip 256. The buttons 254 are each secured to the outer end of the shaft, the inner end thereof carrying a lever 258, the free end of which extends into and meshes with its own slot of a vertical clearing bar 260, the latter being guided for vertical movement within the compartment enclosure. The clearing bar 260 at its lower end is connected to a cross pivoted lever 261 carrying a cam roller 262 bearing on cam 263 individual to the unit assembly. The cams for all assemblies are carried on a common operating shaft 264, the driving means therefor to be described.

Each button shaft carries a contact pin 266 adapted for engagement with spaced terminals or posts 267, 268, which may be carried by the panel 251 of the unit assembly. In the neutral or zero position of the buttons the contact pins thereof are maintained out of engagement with the terminals by an over-center spring 270. The buttons are set by imparting a slight angular turn in clockwise direction thereto, whereupon the over-center spring 270 causes the button lever 258 to engage against the lower edge of its clearing bar slot as the bar is maintained in its intermediate position. Upon movement of the latter to its lowermost position, over-center spring 270 effects final turning movement of button shaft 255, thus to effect engagement of the contact pin 266 with the terminals 267, 268, whereupon the button is in full "on" position.

When in the latter position a circuit including one of the tab setting solenoids ST of the station bank thereof is closed. According to the preferred connection and wiring arrangement, #1 button of row #1 is connected to the #1 tab setting solenoid ST, #2 button of said row is connected to the #2 tab setting solenoid ST, and so on. Moreover, the eight buttons of the vertical rows thereof are each cross connected with those of the same number in the other rows in the supply conductors to the tab setting solenoids. Thus, the six #1 buttons of the first horizontal row thereof are each cross connected in the supply conductor (corresponding to supply conductor 222 of the Fig. 19 wiring diagram) to one side of the #1 tab setting solenoid ST, the six buttons of the second horizontal row are each cross connected in the supply conductor for the #2 tab setting solenoid ST, and so on. It will be understood that the solenoids are connected at their other sides to a common return conductor corresponding to the conductor 226 shown in Fig. 19.

Each cam 263 has a short radius arcuate portion 263a, an intermediate radius portion 263b, and a lobe 263c of relatively great radius. Thus, referring to Fig. 22, vertical clearing bar 260 is in low position when cam roller 262 engages cam portion 263a and, in the latter position, closure of the local circuits whose buttons have been set as aforesaid is effected by reason of the fact that the set button levers 256 move to their full turned position. With cam roller 262 riding on cam portion 263b, the clearing bar is in its intermediate position. Accordingly, buttons which have been conditioned for closing by initial turning thereof by the operator are nevertheless held against full circuit closing movement by the clearing bar. When cam roller 262 engages cam lobe 263c, the vertical bar 260 is moved to its up position to clear all previously set buttons of that row, by imparting turning movement to the button levers 258 in a counter-clockwise direction. The over-center spring 270 assists in such return movement upon the levers moving past their dead center position and thereafter maintains the cleared button in its "off" position. Cam 263 is adapted to be turned in clockwise direction so that, following making of the local button circuits whose buttons have been previously set, the clearing bar 260 through its engagement with cam lobe 263c thereafter clears the set buttons. Hence, resetting of the buttons can be effected immediately following the clearing operation as is necessary for rapid dispatch of the loads.

As forecast in the foregoing, all cams of the unit assemblies are carried by the common operating shaft 264. With the described arrangement providing for six successive selections, the cams are spaced 60° from each other so that only one vertical lane or row of buttons is in active position at any one time.

A multiple selecting mechanism as described is organized with the station mechanism of each dispatch station, and the cam shaft 264 is adapted to be given a 60° rotation upon each operation of its associated station mechanism. Accordingly, the shaft carries at one end thereof a sprocket 275 having a driving connection with a dispatch station mechanism, as shown in each of Figs. 13, 14, 17 and 18. Referring to Figs. 13 and 14 illustrating the station mechanism for the dispatching stations on the ascending side, the shaft carrying intermediate gear 151 thereof in turn carries a sprocket 276 having a driving connection with a sprocket 277 keyed on shaft 278 carried by the station framework. The shaft carries a sprocket 279 which in turn drives a sprocket 280, the latter driving the cam shaft sprocket 275. A generally similar driving connection is employed between the station mechanism for the dispatch stations on the descending side and the cam shaft of its associated selecting mechanism, for which see Figs. 17 and 18. The sprocket ratios are such that a complete rotation of gear 151 by the station pinion 41 results in a 60° rotation of the operating cam shaft 264, as is required to make active one of the vertical rows or lanes of selecting buttons. When such lane is rendered active, circuits are completed through all of the local button circuits thereof whose buttons have been previously set. Thereupon, upon an empty ascending car closing the circuit maker CM—1, and upon the series connected circuit maker CM—2 being closed by a load in position for dispatch, at least one of the solenoids ST of the station control circuit is energized to effect setting of a car tab corresponding to the particular solenoid so energized. During movement of the station carriage CT throughout its cycle, the common cam shaft is turned ⅙ of a revolution and effects clearing of the previously set buttons of the aforesaid active lane. Such turning movement of the cam shaft also brings the next cam into active position, thus making active the next vertical row or lane of buttons. Hence, the vertical rows or lanes of buttons are successively made active by the afore-described cam arrangement and the intermittent drive of the common cam shaft from the station mechanism. Accordingly, an operator can successively set a button (or two such buttons as will hereinafter appear) for each selection, the number of selections corresponding to the number of loads which he desires to dispatch, and the system takes over in such manner that loads of a succession thereof are dispatched to the next empty cars moving into the station and the succession of selections are transferred in automatic manner to the cars without further attention by the operator.

An indicating light may be positioned behind each of the bull's-eyes 252 and, according to the preferred arrangement, the light for the vertical lane which is then active is lighted, thus to indicate to the operator that the vertical lanes to the right of the lighted lane are available for selection, and also to signify to the operator the starting lane for a succession of selections. The lights are each under the control of an associated switch 285 of the circuit-breaking type, the latter being provided with a plunger 286 extending downwardly into the path of movement of the vertical clearing bars 260. The preferred wiring of the lights and switches 285 is such that only switch 285 of the vertical lane then active is closed to complete a circuit through the light behind the bull's-eye of that lane. This is accomplished by so predetermining the length of the clearing bars 260 that their upper ends clear the switch plungers only when said bars are in their full low position, as when the cam rollers 262 thereof ride on the short radius portions 263a of the bar actuating cams. As the clearing bar of the then active lane is the only one in its low position, all other bars being held in their intermediate position by the cam portions 263b, in which their upper ends engage switch plungers 236, only the active lane is lighted, and the operator is thereby advised that the lanes to the right thereof are available for selection. Moreover, by taking into account the number of undispatched loads of a succession thereof in position for dispatch in relation to the lighted active lane and the lanes to the right thereof which were conditioned to become active due to manual setting of a button or buttons thereof, the operator is able to determine the starting lane for a new succession or cycle of selections which he may desire to set up.

Since the system as shown requires a combination of two car tabs to energize the control at the selected receiving station, the particular selecting arrangement is such that two buttons of a row must be set by the operator for each selection and a related dispatch operation. Thus, with the #1 buttons controlling the #1 tab setting solenoid ST, the #2 buttons controlling the #2 tab setting solenoid ST, and so on, the arrangement is preferably such that buttons 1 and 2 of a vertical lane thereof are set for a first floor selection, buttons 1 and 3 are set for a second floor selection, buttons 1 and 4 are set for a third floor selection, and so on, up to floor No. 7. For floors Nos. 8-13 inclusive, selection is effected by setting buttons 2 and 3, buttons 2 and 4, and so on. For floor No. 14, buttons 3 and 4 are set, and so on, up to floor No. 28 which requires setting of buttons 7 and 8.

Since the buttons are easily set by hand, corrections can be readily made in a setting up to the time that the station mechanism at a particular dispatch station begins to operate, it being understood that at this moment the solenoid actuated tab setting arms move into position to set the car tabs.

To provide for a succession of other than six selections requiring six cams set at 60°, any other number of selections such as four can be made by a selector provided with cams set at 90° or such as ten with cams set at 36°. With the cam shaft moving only when a load is dispatched at the particular station with which the selecting device is associated, it will be seen that the operation of the selecting panel may be termed "selectively continuous" with the cycle repeating itself in accordance with continued selections upon the completion of the six consecutive selections permitted by the aforesaid selecting mechanism.

Figure 24:
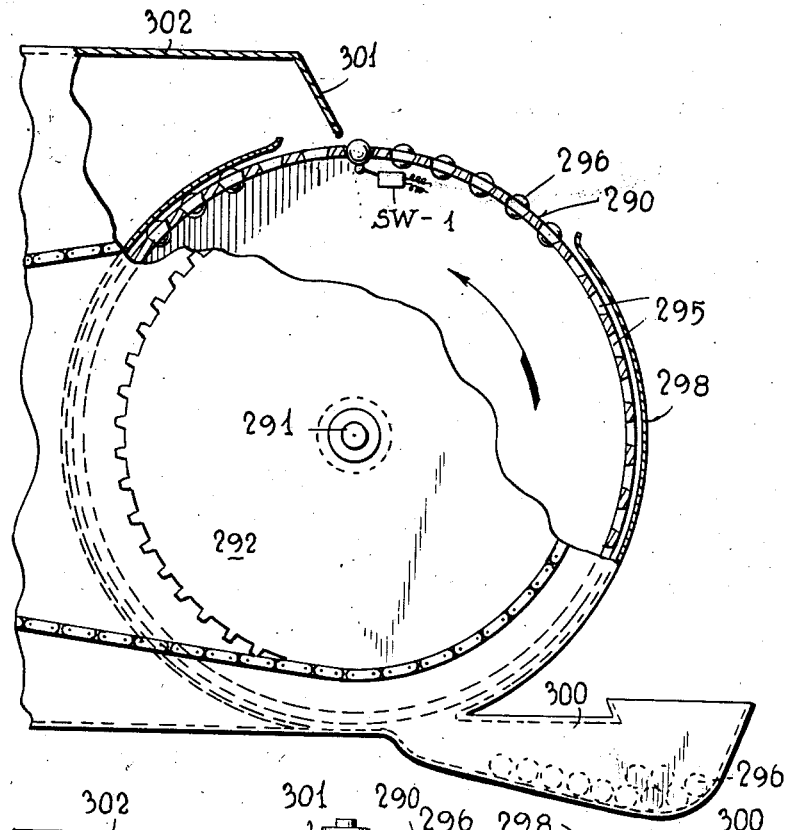
Figs. 24 and 25 are, respectively, broken-away side and plan views of a modified form of multiple selecting mechanism in accordance with the invention.
Figure 25:
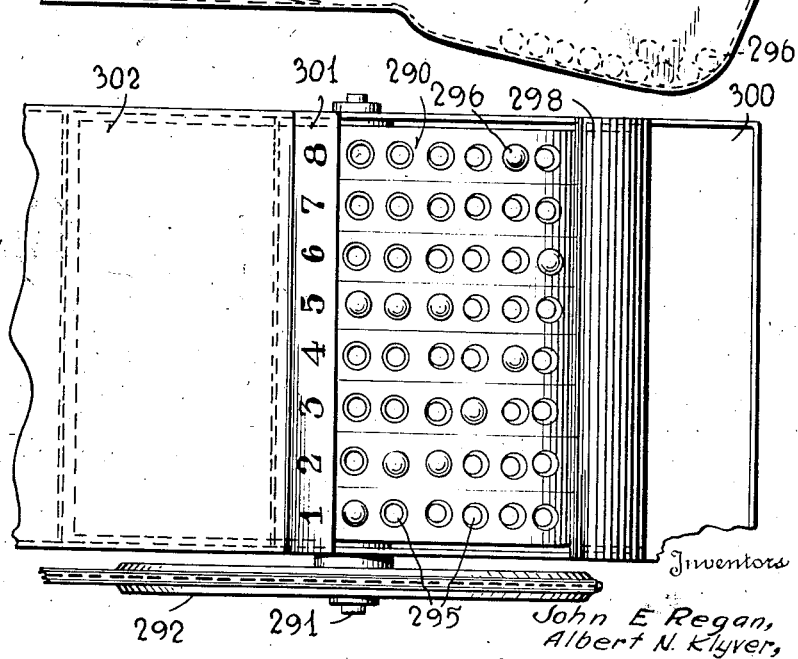

An alternative form of multiple selecting mechanism is illustrated in Figs. 24 and 25 and will be hereinafter referred to as the ball-type selecting means, as distinguished from the panel-type selecting means just described. As in the case of the latter, a ball-type selecting means is associated with each dispatch station and is driven by the station mechanism thereof to operate on the multiple dispatch principle as outlined in the foregoing. As shown, each ball-type selector employs a rotary drum 290 fast on a horizontal shaft 291 which is suitably journaled for rotation in the station framework. The shaft carries a driving sprocket 292 which is driven from the station sprocket 280 (Figs. 13 and 14). The drum is subdivided into circumferential lanes corresponding in number to the number of tab setting solenoids ST. If desired, the drum may be constructed from ring sections suitably secured together, in which event each ring surface forms a circumferential lane. For the system under description, the drum is provided with eight lanes to correspond to the eight solenoids ST of the station set thereof. Each lane of the drum is provided with a series of holes 295, and the holes of the eight series thereof are arranged in horizontal rows across the drum.

The holes 295 are of a uniform diameter which is slightly less than the diameter of balls 296, which latter are adapted to be dropped by the operator into selected holes of the upper filling segment of the drum. By "filling segment" is meant the horizontal or flat-arc drum segment on the operator side of the vertical center line of the drum. The diameter of the drum is dependent on the number of holes required in the filling segment, and the drum illustrated is of sufficient diameter as to provide a filling segment holding six balls to correspond to the chosen maximum number of six loads available for dispatch at any one time.

The drum, except for its filling segment, is enclosed in a fixed shell or casing 298. Along its bottom the casing is provided with an opening delivering to a reservoir 300 for returned balls. The upper edge of the filling segment may be defined by a cross wall 301, the outer face of which carries numbers designating the eight circumferential lanes of the drum. As shown, the cross wall depends from a horizontal wall or table 302 which with the cross wall forms an enclosure.

Within the drum 290 is arranged a cross row of switches SW—1, one for each drum lane and hence one for each tab setting solenoid ST. The switches SW—1 are each adapted to be closed by a ball 296 dropped into a corresponding hole of the topmost row thereof or by balls positioned in the holes of the succeeding rows thereof moving into engagement therewith upon advance movement of the drum. When any one of the switches SW—1 is so closed a circuit through its related solenoid ST is completed and the solenoid is conditioned to effect setting of a corresponding car tab.

Upon further advance movement of the drum, the ball or balls of the topmost or active row thereof move out of engagement with the switches SW—1 and, during subsequent movement of the drum, are confined by the shell 298 until they drop from the drum holes and collect in reservoir 300 for reuse.

By suitable circuit arrangements, the operator may effect multiple dispatch by dropping one ball in the uppermost horizontal row of holes in the filling segment, a second ball in the second from the top row, and so on, until six balls have been placed in the filling segment to correspond to the maximum number of loads ready for dispatch. For every operation of the associated station mechanism, the drum is advanced a distance corresponding to the distance between center lines of two successive holes of the circumferential series thereof. Thus, by an immediately prior actuation of the associated station mechanism, a ball of the topmost row thereof has rendered the selector operative by its engagement with a switch SW—1 thereby to complete a circuit through a particular tab-setting solenoid ST.

Accordingly the station mechanism with which the selector is associated is conditioned for operation and its cycle of operation is initiated upon the load tell-tale of the first empty car engaging the station circuit maker CM—I, in accordance with the prior description. During such operation, the drum is given a further advance movement and the ball of the second from the top row moves to active position, in which it engages one of the switches SW—I. This operation is continued until the succession of six loads have been dispatched.

The operation of the selecting mechanism as described may be continued indefinitely, if desired, by maintaining the filling segment of the drum filled with balls as by dropping one ball in the lowest horizontal row of holes of the filling segment following each advance movement of the drum.

With the present system requiring the setting of two car tabs in correspondence with each selection, two balls are dropped into two holes of the topmost row thereof, two in the second from the top row, and so on, through the available rows of the filling segment. To use the same indexing previously described in connection with the panel-type selector, balls are dropped into the horizontally related holes of lanes No. 1 and No. 2 of the topmost row for a first-floor selection, into horizontally related holes of lanes No. 1 and No. 3 for a second-floor selection, and so on, up to a selection for the 28th floor, the latter requiring that balls be dropped into the horizontally related holes of lanes No. 7 and No. 8.

Without further analysis, it will be seen that the present invention provides a fully automatic intercommunicating conveyer system of simple and practical construction. Moreover, the system of the invention provides the shortest way service between floors served thereby and hence overcomes the known disadvantages of slow and cumbersome operation characterizing the prior systems.

As many changes could be made in carrying out the above constructions without departing from the scope of the invention, it is intended that all matter contained in the above description or shown in the accompanying drawings shall be interpreted as illustrative and not in a limiting sense.

We claim:

1. A vertical conveyer system comprising, in combination, an endless vertically disposed conveyer chain, driving means therefor, a plurality of load carriers movable with the chain, dispatch and delivery stations disposed adjacent both the ascending and descending runs of the chain each including station mechanism actuable into and out of load transfer position with reference to carriers passing the same, means for actuating the station mechanism of any one of the dispatch stations having a load ready for dispatch thereby to transfer the ready load to an empty carrier passing said station, means for actuating the station mechanism of any one of the delivery stations upon the arrival of a carrier bearing a load destined thereto, and selectively operable means associated with each of the dispatch stations for controlling the destination of loads dispatched therefrom.

2. A vertical conveyer system comprising, in combination, an endless vertically disposed conveyer chain, driving means therefor, a plurality of load carriers movable with the chain, dispatch and delivery stations disposed adjacent both the ascending and descending runs of the chain each including station mechanism actuable into and out of load transfer position with reference to carriers passing the same, means responsive to the fulfillment of system conditions for load dispatch for actuating in automatic manner the station mechanism of any one of the dispatch stations thereby to transfer a ready load to a carrier passing said station, means responding to the fulfillment of system conditions for load delivery for actuating in automatic manner the station mechanism of any one of the delivery stations thereby to effect delivery of a load destined to said station, and selectively operable means associated with each of the dispatch stations for controlling the destination of loads dispatched therefrom.

3. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism movable into and out of a load transfer position with reference to a car passing the station, means for actuating said mechanisms, and means operatively related to each of the dispatch stations for controlling actuation of the station mechanism thereof and thereupon of the station mechanism of any selected one of said delivery stations.

4. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism movable into and out of a load transfer position with reference to a car passing the station, means for actuating said mechanisms, and means operatively related to each of the dispatch stations for controlling actuation of the station mechanism thereof and for selecting the delivery station at which a load is to be delivered through actuation of the station mechanism thereof to its load transfer position.

5. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism movable into and out of a load transfer position with reference to a car passing the station, means for actuating any one of said dispatch station mechanisms having a load ready for dispatch into load transfer position thereby to effect transfer of the ready load to a passing car, means operatively related to each dispatch station for selecting the delivery station at which the ready load is to be delivered, and means for actuating the station mechanism of the selected delivery station upon the arrival at said station of a car bearing a load destined thereto.

6. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism movable into and out of a load transfer position with reference to a car passing the station, means for actuating any one of said dispatch station mechanisms having a load ready for dispatch into load transfer position thereby to effect transfer of the ready load to a passing car, said means being operable upon the approach to said station of any empty car and in response to a selection of the delivery station at which the ready load is to be delivered, and means for actuating the station mechanism of the selected receiving station upon the arrival thereat of a car bearing a load destined thereto.

7. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism movable into and out of a load transfer position with reference to a car passing the station, means for actuating any one of said dispatch station mechanisms into load transfer position thereby to effect transfer of a ready load to a passing car, said means being operable only when a load is ready for dispatch and in response to the approach of an empty car to that station and to a selection of the delivery station at which the ready load is to be delivered, and means for actuating the station mechanism of the selected receiving station upon the arrival thereat of a car bearing a load destined thereto.

8. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism movable into and out of a load transfer position with reference to a car passing the station, means for actuating any one of the dispatch station mechanisms having a load ready for dispatch into load transfer position, means by which the operator at said one dispatch station is enabled to select the delivery station to which the ready load is to be delivered, and means operative in response to the arrival at the selected delivery station of a car bearing a load destined thereto for actuating the station mechanism thereof into load transfer position.

9. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism movable into and out of a load transfer position with reference to a car passing the station, means for actuating any one of the dispatch station mechanisms having a load ready for dispatch into load transfer position, means by which the operator at said one dispatch station is enabled to select the delivery station at which the ready load is to be delivered, and means operative in response to the arrival at the selected delivery station of a car bearing a load destined thereto for actuating the station mechanism thereof into load transfer position, said last-named means being inoperative when the selected receiving station is unable to receive the load destined thereto.

10. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism movable into and out of a load transfer position with reference to a car passing the station, means for actuating any one of the dispatch station mechanisms having a load ready for dispatch in response to the approach thereto of an empty car, means by which the operator at said one dispatch station is enabled to select the delivery station at which the ready load is to be delivered, and means operative in response to the arrival at the selected delivery station of a car bearing a load destined thereto for actuation of the station mechanism thereof into load transfer position.

11. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism movable into and out of a load transfer position with reference to a car passing the station, means for actuating any one of the dispatch station mechanisms having a load ready for dispatch into its load transfer position, selecting means operatively related to each dispatch station and being settable to correspond to the delivery station at which the ready load is to be delivered, means for transferring the setting of said selecting means to a passing car to which the ready load is transferred, and means individual to the delivery stations and operable by a car upon its arrival at a receiving station corresponding to the selection for actuating the station mechanism thereof.

12. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism movable into and out of a load transfer position with reference to a car passing the station, means for actuating any one of the dispatch station mechanisms having a load ready for dispatch into its load transfer position, selecting means operatively related to each dispatch station and being settable to correspond with the delivery station to which the ready load is to be delivered, the car carrying devices which are settable to correspond with the setting of the selecting means, means for transferring the setting of the latter to the car devices of a car to which a ready load is transferred by actuation of a dispatch station mechanism, and means individual to the receiving stations and operable by the set car devices upon the arrival at a selected receiving station of a car bearing a load destined thereto for actuating the station mechanism thereof.

13. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism having an operating cycle of movement from a retracted to a load transfer position with reference to a passing car and thence back to retracted position, and means for operating the mechanism throughout its cycle, a normally ineffective drive connection between the chain and each of the mechanism operating means, means for rendering effective the drive connection between the chain and the mechanism operating means of any one dispatch station having a load ready for dispatch, means responsive to the arrival at a selected delivery station of a car bearing a load destined thereto for rendering effective the drive connection between the chain and the mechanism operating means of that delivery station and means operatively related to each dispatch station by which the operator is enabled to select the delivery station at which the ready load is to be delivered.

14. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors including a delivery and a dispatch station adjacent the ascending run and a delivery and a dispatch station adjacent the descending run of the chain, said stations each including mechanism having an operating cycle of movement from a retracted to a load transfer position with reference to a passing car and thence back to retracted position and means for operating the mechanism throughout its cycle, a normally ineffective drive connection between the chain and each of the mechanism operating means, means for rendering effective the drive connection between the chain and the mechanism operating means of any one dispatch station having a load ready for dispatch, said last means being operable only upon the approach of an empty car to that station and to the selection of the delivery station at which the ready load following its dispatch is to be delivered, means for rendering effective the drive connection between the chain and the mechanism operating means of the delivery station selected for load delivery, said last means being operable only upon the arrival at the selected delivery station of a car bearing a load destined thereto and when the selected receiving station is able to receive that load, and means operatively related to each dispatch station by which the operator is enabled to select the delivery station at which a load ready for dispatch is to be delivered.

15. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors of the building, each said set comprising a delivery and a dispatch station arranged one above the other adjacent the ascending run and a delivery and a dispatch station arranged one above the other adjacent the descending run of the chain, each said station including mechanism actuable into and out of a load transfer position with reference to passing cars, automatically operable means for actuating the station mechanism of any one dispatch station into and out of load transfer position upon the fulfillment of prescribed system conditions including that of an operator at said dispatch station making a selection of the delivery station at which a load ready for dispatch is to be delivered, and automatically operable means for actuating the station mechanism of the selected receiving station upon the fulfillment of prescribed system conditions.

16. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of stations for each of the several floors of the building, each said set comprising a delivery and a dispatch station arranged one above the other adjacent the ascending run and a delivery and a dispatch station arranged one above the other adjacent the descending run of the chain, each said station including mechanism actuable into and out of a load transfer position with reference to passing cars, automatically operable means for actuating the station mechanism of any one dispatch station into and out of load transfer position upon the fulfillment of prescribed system conditions including that of an operator at said dispatch station making a selection of the delivery station at which a load ready for dispatch is to be delivered, and automatically operable means for actuating the station mechanism of the selected receiving station upon the fulfillment of prescribed system conditions, the arrangement being such that upon non-actuation of the mechanism of the selected receiving station the load is carried part-way around the system for delivery at a delivery station located on the same floor as the selected delivery station.

17. A conveyer system comprising, in combination, an endless conveyer chain, driving means therefor, load conveying cars carried by said chain for travel therewith in an endless path, dispatch and delivery stations disposed adjacent said path, each including mechanism movable into and out of load transfer position with reference to the traveling cars and operating means therefor, normally disengaged gear means adapted when engaged to transmit drive from said chain to the mechanism operating means of any one of the stations, operator-controlled means at each dispatch station for causing engagement of the gear means whereby to drive the mechanism operating means of any one dispatch station and to effect transfer of a load to a car passing the same, and car-controlled means responsive for its actuation to the arrival at a selected delivery station of a car bearing a load destined thereto for causing engagement of the gear means whereby to drive the mechanism operating means of the selected station and to effect transfer of a load from said car to the station mechanism.

18. A conveyer system comprising, in combination, an endless conveyer chain, driving means therefor, load conveying cars carried by said chain for travel therewith in an endless path, dispatch and delivery stations disposed adjacent said path, each including mechanism movable into and out of load transfer position with reference to the traveling cars and operating means therefor, normally disengaged gear means including station and car-carried gear elements adapted when engaged to transmit drive from said chain to the station mechanism operating means, operator-controlled means at each dispatch station for causing engagement of said gear elements upon an empty car approaching said station, and car-controlled means for causing engagement of said gear elements upon the arrival at a selected delivery station of a car bearing a load destined thereto.

19. A conveyer system comprising, in combination, an endless conveyer chain, driving means therefor, load conveying cars carried by said chain for travel therewith in an endless path, dispatch and delivery stations disposed adjacent said path, each including mechanism movable into and out of load transfer position with reference to the traveling cars and operating means therefor, a driving connection for each of said operating means including rack and pinion elements of which one element has a normally inactive position but is movable into active position with reference to the other element in which it transmits drive from the chain to said mechanism operating means, operator-controlled means for actuating to its active position the movable element of the driving connection for the mechanism operating means of any one dispatch station, and car-controlled means for actuating to its active position the movable element of the driving connection for a selected one of the delivery stations.

20. A conveyer system comprising, in combination, an endless conveyer chain, driving means therefor, load conveying cars carried by said chain for travel therewith in an endless path, dispatch and delivery stations disposed adjacent said path, each including mechanism movable into and out of load transfer position with reference to the traveling cars and operating means therefor, the cars being each provided with a rack, a pinion for each of said stations having a normal position out of, but mounted for movement into, the line of travel of the car racks whereupon it transmits drive from the car to the station mechanism operating means, operator-controlled means for moving the pinion of any one dispatch station into the line of travel of the car racks, and car-controlled means for moving the pinion of a selected one of said delivery stations into the line of travel of the car racks.

21. A conveyer system comprising, in combination, an endless conveyer chain, driving means therefor, load conveying cars carried by said chain for travel therewith in an endless path, dispatch and delivery stations disposed adjacent said path, each including mechanism movable into and out of load transfer position with reference to the traveling cars and operating means therefor, a driving connection between the chain and each said operating means including a station element having a normally inactive position, a station solenoid adapted when energized to actuate said element to an active position, a normally open electrical control circuit including a station solenoid for each dispatch station, means for closing the control circuit of any one dispatch station in response to an empty car approaching the station and to the selection of the delivery station to which a load ready for dispatch is to be delivered, a normally open electrical control circuit including a station solenoid for each delivery station, and means for closing the control circuit of a selected delivery station in response to the arrival thereat of a car bearing a load destined thereto and under the condition that the selected receiving station can receive the load.

22. In a vertical conveyer system employing a continuously driven chain having ascending and descending runs, driving means therefor and load conveying cars carried by said chain for travel therewith in an endless path, the combination of dispatch and delivery stations disposed adjacent the ascending path of car travel, the dispatch station including a loading member reciprocable into and out of said path, and mechanism powered by said chain means for reciprocating the member into and out of said paths as aforesaid thereby to transfer a load ready for dispatch to an empty ascending car, the delivery station including an unloading member mounted for movement in a generally upward direction and along an arc which intersects said path, normally inoperative mechanism powered by said chain means for actuating the unloading member as aforesaid, and means for rendering said actuating means operative in response to the arrival of the loaded car at said delivery station.

23. In a vertical conveyer system employing a continuously driven chain having ascending and descending runs, driving means therefor and load conveying cars carried by said chain for travel therewith in an endless path, the combination of dispatch and delivery stations disposed adjacent the ascending path of car travel, the dispatch station including a loading carriage reciprocable into and out of said path, and mechanism powered by said chain means for reciprocating the carriage into and out of said path as aforesaid thereby to transfer a load ready for dispatch to an empty ascending car, said delivery station including a rotary unloading arm mounted for turning movement in a generally upward direction about a fixed axis and along an arc which intersects the path of travel of the ascending cars, normally inoperative mechanism powered by said chain for actuating said arm as aforesaid, and means for rendering said actuating means operative in response to the arrival of the loaded car at said delivery station.

24. In a vertical conveyer system employing a continuously driven chain having ascending and descending runs, driving means therefor and load conveying cars carried by said chain for travel therewith in an endless path, the combination of dispatch and delivery stations disposed adjacent the path of travel of the descending cars, said dispatch station including a loading member mounted for generally downward movement from a neutral position along an arc which intersects said path, and means for actuating said member as aforesaid thereby to transfer a load ready for dispatch to an empty descending car, said delivery mechanism including an unloading member reciprocable into and out of said path, and normally inoperative means for actuating the member as aforesaid, and means for rendering said last named actuating means operative in response to the arrival of a loaded car at said delivery station.

25. In a vertical conveyer system employing a continuously driven chain having ascending and descending runs, driving means therefor and load conveying cars carried by said chain for travel therewith in an endless path, the combination of dispatch and delivery stations disposed adjacent the path of travel of the descending cars, said dispatch station including a rotary unloading arm mounted for turning movement in a generally downward direction about a fixed axis and along an arc which intersects said path, means for actuating said arm as aforesaid thereby to transfer a load ready for dispatch to an empty descending car, said delivery station including an unloading carriage reciprocable into and out of said path, normally inoperative means for reciprocating said carriage as aforesaid, and means for rendering said actuating means operative upon the arrival of a loaded car at said delivery station.

26. In a traveling conveyer, the combination of load conveying means, a dispatch station, a plurality of delivery stations adjacent the path of the conveying means, the dispatch station including mechanism movable into and out of the path of said conveying means to transfer thereto a load ready for dispatch and means for actuating said mechanism, and multiple selecting mechanism operatively related to said dispatch station, said selecting mechanism including means for setting up a succession of selections for a succession of loads ready for dispatch, each setting of the succession thereof corresponding to a particular load of the succession thereof and to the delivery station to which that load is to be delivered, and means interrelating the mechanism actuating means and the selecting mechanism so that the dispatch station mechanism is operated once for each active setting of the succession thereof, and said settings are rendered active in the order of the loads to which they correspond responsively to the actuations of the dispatch station mechanism.

27. In a traveling conveyer, the combination of load conveying means, a dispatch station, a plurality of delivery stations adjacent the path of the conveying means, the dispatch station including mechanism movable into and out of the path of said conveying means to transfer thereto a load ready for dispatch and means for actuating said mechanism, and multiple selecting mechanism operatively related to said dispatch station, said selecting mechanism including means for setting up a succession of selections for a succession of loads ready for dispatch, each setting of the succession thereof corresponding to a particular load of the succession thereof and to the delivery station to which that load is to be delivered, and means interrelating the mechanism actuating means and the selecting mechanism so that the settings of the succession thereof when rendered active control the operation of the mechanism actuating means and said actuating means render the settings active in the order of the loads to which they correspond.

28. In a traveling conveyer, the combination of load conveying means, a dispatch station, a plurality of delivery stations adjacent the path of the conveying means, the dispatch station including mechanism movable into and out of the path of said conveying means to transfer thereto a load ready for dispatch and means for actuating said mechanism, and multiple selecting mechanism operatively related to said dispatch station, said selecting mechanism including means for setting up a succession of selections for a succession of loads ready for dispatch, each setting of the succession thereof corresponding to a particular load of the succession thereof and to the delivery station to which that load is to be delivered, means controlled by said settings when the latter are rendered active for actuating the station mechanism once for each such setting, thereby to transfer the loads of the succession thereof to the conveying means, and means organized with the mechanism actuating means for rendering each setting of the succession thereof active in the order of the loads to which the settings correspond.

29. A multiple selecting mechanism for conveyer systems comprising, in combination, load-conveying means, a dispatch station including load dispatching means adapted upon actuation to effect transfer of a ready load to said conveying means, means at said station for setting up a succession of selections each corresponding to a load of a succession thereof ready for dispatch, and means responding in automatic manner to the actuations of said dispatching means for rendering said selections active in the order of the loads to which they correspond.

30. A multiple selecting mechanism for conveyer systems comprising, in combination, load-conveying means, a dispatch station including load dispatching means adapted upon actuation to transfer a ready load to said conveying means, selecting means at said dispatch station including manually actuable elements which are arranged in rows corresponding in number to the number of loads of a succession thereof ready for dispatch and which upon actuation are operative to set up a succession of selections for said loads, and means responding in automatic manner to the actuations of said dispatching means for rendering said selections active in the order of the loads to which they correspond.

31. A multiple selecting mechanism for conveyer systems comprising, in combination, load-conveying means, a dispatch station including load dispatching means adapted upon actuation to transfer a ready load to said conveying means, selecting means at said dispatch station including a mounting panel, manually actuable elements mounted in row formation on said panel, the number of rows corresponding to the number of loads of a succession thereof ready for dispatch and the number of elements of a row being such as to provide selections individual to each of a plurality of load destinations permitted by said system, selected elements upon actuation thereof being operative to set up a succession of selections corresponding to the loads of the succession thereof, and means responding in automatic manner to the actuations of said dispatching means for rendering selected elements active in the order of the loads to which they correspond.

32. A multiple selecting mechanism for conveyer systems comprising, in combination, load-conveying means, a dispatch station including load dispatching means adapted upon actuation to effect transfer of a ready load to said conveying means, selecting means at the dispatch station including a drum mounted for rotary movement about a horizontal axis, the drum being divided into circumferential lanes, each lane being provided with a series of ball receiving holes and the holes of the lanes being arranged in horizontal rows across the drum, a horizontal row of switches adjacent the top of the drum, there being one switch for each drum lane, and the switches being engageable by a ball or balls disposed in holes of the then topmost row thereof, and means responding in automatic manner to each actuation of the dispatching means for intermittently rotating the drum, thereby successively to advance the ball or balls in the then topmost row of holes into engagement with one or more of said switches.

JOHN E. REGAN.
ALBERT N. KLYVER.